US00RE48358E

(19) United States
(12) Reissued Patent
Jang

(10) Patent Number: US RE48,358 E
(45) Date of Reissued Patent: Dec. 15, 2020

(54) EMISSION CONTROL DRIVER AND ORGANIC LIGHT EMITTING DISPLAY DEVICE HAVING THE SAME

(71) Applicant: SAMSUNG DISPLAY CO., LTD., Yongin-si (KR)

(72) Inventor: Hwan Soo Jang, Cheonan-si (KR)

(73) Assignee: Samsung Display Co., Ltd., Yongin-si (KR)

(21) Appl. No.: 16/249,327

(22) Filed: Jan. 16, 2019

Related U.S. Patent Documents

Reissue of:

(64) Patent No.: 9,548,026
Issued: Jan. 17, 2017
Appl. No.: 13/781,861
Filed: Mar. 1, 2013

(30) Foreign Application Priority Data

Aug. 21, 2012 (KR) ..... 10-2012-0091442

(51) Int. Cl.
*G09G 3/32* (2016.01)
*G09G 3/20* (2006.01)
(Continued)

(52) U.S. Cl.
CPC ..... *G09G 3/3291* (2013.01); *G09G 3/3266* (2013.01); *G09G 3/2022* (2013.01);
(Continued)

(58) Field of Classification Search
CPC ..... G09G 3/20; G09G 3/32; G09G 3/3291; G09G 3/3266; G09G 3/2022;
(Continued)

(56) References Cited

U.S. PATENT DOCUMENTS 7,623,097 B2 11/2009 Chung
7,920,109 B2 4/2011 Chung
(Continued)

FOREIGN PATENT DOCUMENTS

CN 102385835 A 3/2012
CN 102592539 A 7/2012
(Continued)

OTHER PUBLICATIONS

EPO Office Action dated Mar. 18, 2020, for corresponding European Patent Application No. 13178175.9 (6 pages).

*Primary Examiner* — My Trang Ton
(74) *Attorney, Agent, or Firm* — Lewis Roca Rothgerber Christie LLP

(57) ABSTRACT

An emission control driver includes stages sequentially outputting emission control signals through emission control lines. Each stage includes a first signal processor receiving a first voltage and generating first and second signals in response to first and second sub-control signals, a second signal processor receiving a second voltage having a level higher than a level of the first voltage and generating third and fourth signals in response to the third sub-control signal, the first signal, and the second signal, and a third signal processor receiving the first and second voltages and generating the emission control signal in response to the third and fourth signals. The first signal processor of each stage receives the emission control signal output from a previous stage as the first sub-control signal, and the first signal processor of a first stage among the stages receives a start signal as the first sub-control signal.

38 Claims, 10 Drawing Sheets

(51) Int. Cl.
*G09G 3/3291* (2016.01)
*G09G 3/3266* (2016.01)

(52) U.S. Cl.
CPC . *G09G 2230/00* (2013.01); *G09G 2300/0861* (2013.01); *G09G 2310/0202* (2013.01); *G09G 2310/0262* (2013.01); *G09G 2310/0283* (2013.01); *G09G 2310/0286* (2013.01)

(58) Field of Classification Search
CPC ..... G09G 2230/00; G09G 2300/0861; G09G 2310/0202; G09G 2310/0262; G09G 2310/0283; G09G 2310/0286; G09G 3/2935
See application file for complete search history.

(56) References Cited

U.S. PATENT DOCUMENTS

| | | | | |
|---|---|---|---|---|
| 8,339,424 | B2 | 12/2012 | Jeong et al. | |
| 9,129,562 | B2 | 9/2015 | Jang et al. | |
| 9,311,856 | B2 * | 4/2016 | Park | G09G 3/3266 |
| 2004/0227718 | A1 * | 11/2004 | Park | G09G 3/3677 345/100 |
| 2006/0291610 | A1 * | 12/2006 | Lo et al. | 377/64 |
| 2007/0274432 | A1 | 11/2007 | Yu | |
| 2008/0158109 | A1 | 7/2008 | Chung | |
| 2010/0141641 | A1 * | 6/2010 | Furuta | G11C 19/184 345/213 |
| 2010/0177023 | A1 * | 7/2010 | Han | 345/76 |
| 2010/0177087 | A1 * | 7/2010 | Han | 345/213 |
| 2010/0283715 | A1 * | 11/2010 | Kretz | G09G 3/20 345/100 |
| 2011/0057864 | A1 * | 3/2011 | Chung | 345/76 |
| 2012/0050234 | A1 * | 3/2012 | Jang et al. | 345/204 |
| 2012/0062525 | A1 | 3/2012 | Kim | |
| 2012/0062608 | A1 | 3/2012 | Kim | |

FOREIGN PATENT DOCUMENTS

| | | | |
|---|---|---|---|
| EP | 2423910 | A1 | 8/2011 |
| JP | 2012-048186 | A | 3/2012 |
| KR | 10-0666637 | B1 | 1/2007 |
| KR | 10-0685833 | B1 | 2/2007 |
| KR | 10-0911982 | B1 | 8/2009 |
| KR | 10-2011-0026660 | A | 3/2011 |
| KR | 10-2012-0019227 | A | 3/2012 |
| KR | 10-2012-0028005 | A | 3/2012 |
| KR | 10-2012-0080008 | A | 7/2012 |
| TW | 200609885 | A | 3/2006 |
| TW | 200744061 | A | 12/2007 |

* cited by examiner

EMISSION CONTROL DRIVER AND ORGANIC LIGHT EMITTING DISPLAY DEVICE HAVING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

The present patent application *is a Reissue of U.S. Pat. No. 9,548,026 B2 issued Jan. 17, 2017, and which* claims priority under 35 U.S.C. §119 of Korean Patent Application No. 10-2012-0091442, filed on Aug. 21, 2012, in the Korean Intellectual Property Office and entitled: "Emission Control Driver and Organic Light Emitting Display Device Having the Same," which is incorporated by reference herein in its entirety.

BACKGROUND

1. Field

The present disclosure relates to an emission control driver and an organic light emitting display device having the same. More particularly, the present disclosure relates to an emission control driver capable of simplifying a configuration thereof and an organic light emitting display device having the emission control driver.

2. Description of the Related Art

In recent years, various display devices, such as liquid crystal display devices, organic light emitting display devices, electrowetting display devices, plasma display panels, electrophoretic display devices, etc., have been developed. Organic light emitting display devices display an image using an organic light emitting diode that generates light in association with a recombination between electrons and holes. Organic light emitting display devices have numerous advantages, e.g., fast response speed, low power consumption, etc.

Organic light emitting display devices include a plurality of pixels that displays the image, a scan driver that sequentially applies scan signals to the pixels, a data driver that applies data voltages to the pixels, and an emission control driver that applies emission control signals to the pixels. The pixels receive the data voltages in response to the scan signals. The pixels generate the light with a predetermined brightness corresponding to the data voltages to display the image. An emission time period of the pixels is controlled by the emission control signals. The emission control driver is initialized in response to initialization control signals and generates the emission control signals. However, simplification of the configuration of the emission control driver is desired.

SUMMARY

Embodiments of the inventive concept provide an emission control driver includes a plurality of stages that sequentially outputs emission control signals through emission control lines. Each stage may include a first signal processor that receives a first voltage and generates a first signal and a second signal in response to a first sub-control signal and a second sub-control signal, a second signal processor that receives a second voltage having a level higher than a level of the first voltage and generates a third signal and a fourth signal in response to a third sub-control signal, the first signal, and the second signal, and a third signal processor that receives the first voltage and the second voltage and generates the emission control signal in response to the third signal and the fourth signal. The first signal processor of each stage receives the emission control signal output from a previous stage as the first sub-control signal, and the first signal processor of a first stage among the stages receives a start signal as the first sub-control signal.

The first signal processor of each of odd-numbered stages of the stages receives a first clock signal as the second sub-control signal, the second signal processor of each of the odd-numbered stages of the stages receives a second clock signal as a third sub-control signal, the first signal processor of each of even-numbered stages of the stages receives the second clock signal as the second sub-control signal, and the second signal processor of each of the even-numbered stages of the stages receives the first clock signal as the third sub-control signal.

The first and second clock signals have a same frequency and the second clock signal is obtained by shifting the first clock signal by a first duration corresponding to a half of a period of the first clock signal.

The start signal may be activated at a time point at which the first clock signal changes from a first level to a second level smaller than the first level, and the activation of the start signal is maintained during a second duration corresponding to four times of the first duration.

Each of the light emission control signals may have the level of the second voltage during a third duration corresponding to three times of the first duration, and the emission control signals are sequentially shifted by the first duration.

The first signal processor may include first, second, and third transistors. The first transistor has a gate terminal applied with the second sub-control signal and a source terminal applied with the first sub-control signal. The second transistor has a gate terminal connected to a drain terminal of the first transistor and a drain terminal applied with the second sub-control signal. The third transistor has a gate terminal applied with the second sub-control signal, a source terminal connected to a source terminal of the second transistor, and a drain terminal applied with the first voltage. The first signal is output from the source terminals of the second and third transistors, which are connected to each other, and the second signal is output from the drain terminal of the first transistor.

The second signal processor may include fourth, fifth, sixth, and seventh transistors and first and second capacitors. The fourth transistor has a gate terminal applied with the third sub-control signal and a drain terminal connected to a first node and the drain terminal of the first transistor. The first capacitor has a first electrode applied with the third sub-control signal and a second electrode connected to the drain terminal of the fourth transistor. The fifth transistor has a gate terminal connected to the source terminal of the third transistor and a second node, a source terminal applied with the second voltage, and a drain terminal connected to a source terminal of the fourth transistor. The sixth transistor has a gate terminal connected to the second node and a drain terminal applied with the third sub-control signal. The second capacitor has a first electrode connected to the gate terminal of the sixth transistor and a second electrode connected to a source terminal of the sixth transistor. The seventh transistor has a gate terminal applied with the third sub-control signal, a source terminal connected to a third node, and a drain terminal connected to the source terminal of the sixth transistor. The third signal is applied to the third node, and the fourth signal is applied to the first node.

The third signal processor may include eighth, ninth, and tenth transistors and a third capacitor. The eighth transistor has a gate terminal connected to the first node, a source terminal applied with the second voltage, and a drain terminal connected to the third node. The third capacitor has a first electrode applied with the second voltage and a second electrode connected to the third node. The ninth transistor has a gate terminal connected to the third node, a source terminal applied with the second voltage, and a drain terminal connected to a corresponding emission control line. The tenth transistor has a gate terminal connected to the first node, a source terminal connected to the corresponding emission control line, and a drain terminal applied with the first voltage. The drain terminal of the ninth transistor and the source terminal of the tenth transistor are connected to a source terminal of a first transistor of a first signal processor of a next stage.

Embodiments of the inventive concept provide an organic light emitting display device includes a display panel that includes a plurality of pixels each being connected to a corresponding scan line of scan lines, a corresponding data line of data lines, and a corresponding emission control line of emission control lines, a scan driver that sequentially applies scan signals to the pixels through the scan lines, a data driver that applies data voltages to the pixels through the data lines, and an emission control driver that includes a plurality of stages sequentially applying emission control signals to the pixels through the emission control lines. Each stage may include a first signal processor that receives a first voltage and generates a first signal and a second signal in response to a first sub-control signal and a second sub-control signal, a second signal processor that receives a second voltage having a level higher than a level of the first voltage, and generates a third signal and a fourth signal in response to a third sub-control signal, the first signal, and the second signal, and a third signal processor that receives the first voltage and the second voltage, and generates the emission control signal in response to the third signal and the fourth signal. The first signal processor of each stage receives the emission control signal output from a previous stage as the first sub-control signal, and the first signal processor of a first stage among the stages receives a start signal as the first sub-control signal.

Embodiments of the inventive concept provide an emission control driver that includes a plurality of stages that sequentially outputs emission control signals through emission control lines. Each stage may include a bi-directional driver that outputs a first input signal or a second input signal as a first sub-control signal in response to a first direction control signal and a second direction control signal, a first signal processor that receives a first voltage and generates a first signal and a second signal in response to the first sub-control signal and a second sub-control signal, a second signal processor that receives a second voltage having a level higher than a level of the first voltage and generates a third signal and a fourth signal in response to a third sub-control signal, the first signal, and the second signal, and a third signal processor that receives the first voltage and the second voltage and generates the emission control signal in response to the third signal and the fourth signal. The bi-directional driver receives the emission control signal output from a previous stage as the first input signal and the emission control signal output from a next stage as the second input signal, the bi-directional driver of a first stage among the stages receives a start signal as the first input signal, and the bi-directional driver of a last stage among the stages receives the start signal as the second input signal.

Embodiments of the inventive concept provide an emission control driver that includes a plurality of stages that sequentially outputs emission control signals through emission control lines. Each stage may include a bi-directional driver that outputs a first input signal or a second input signal as a first sub-control signal in response to a first direction control signal and a second direction control signal, a first signal processor that receives a first voltage and generates a first signal and a second signal in response to the first sub-control signal and a second sub-control signal, a second signal processor that receives a second voltage having a level higher than a level of the first voltage and generates a third signal, a fourth signal, and a carry signal in response to a third sub-control signal, the first signal, and the second signal, and a third signal processor that receives the first voltage and the second voltage and generates the emission control signal in response to the third signal and the fourth signal. The bi-directional driver receives the carry signal output from a previous stage as the first input signal and the carry signal output from a next stage as the second input signal, the bi-directional driver of a first stage among the stages receives a start signal as the first input signal, and the bi-directional driver of a last stage among the stages receives the start signal as the second input signal.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
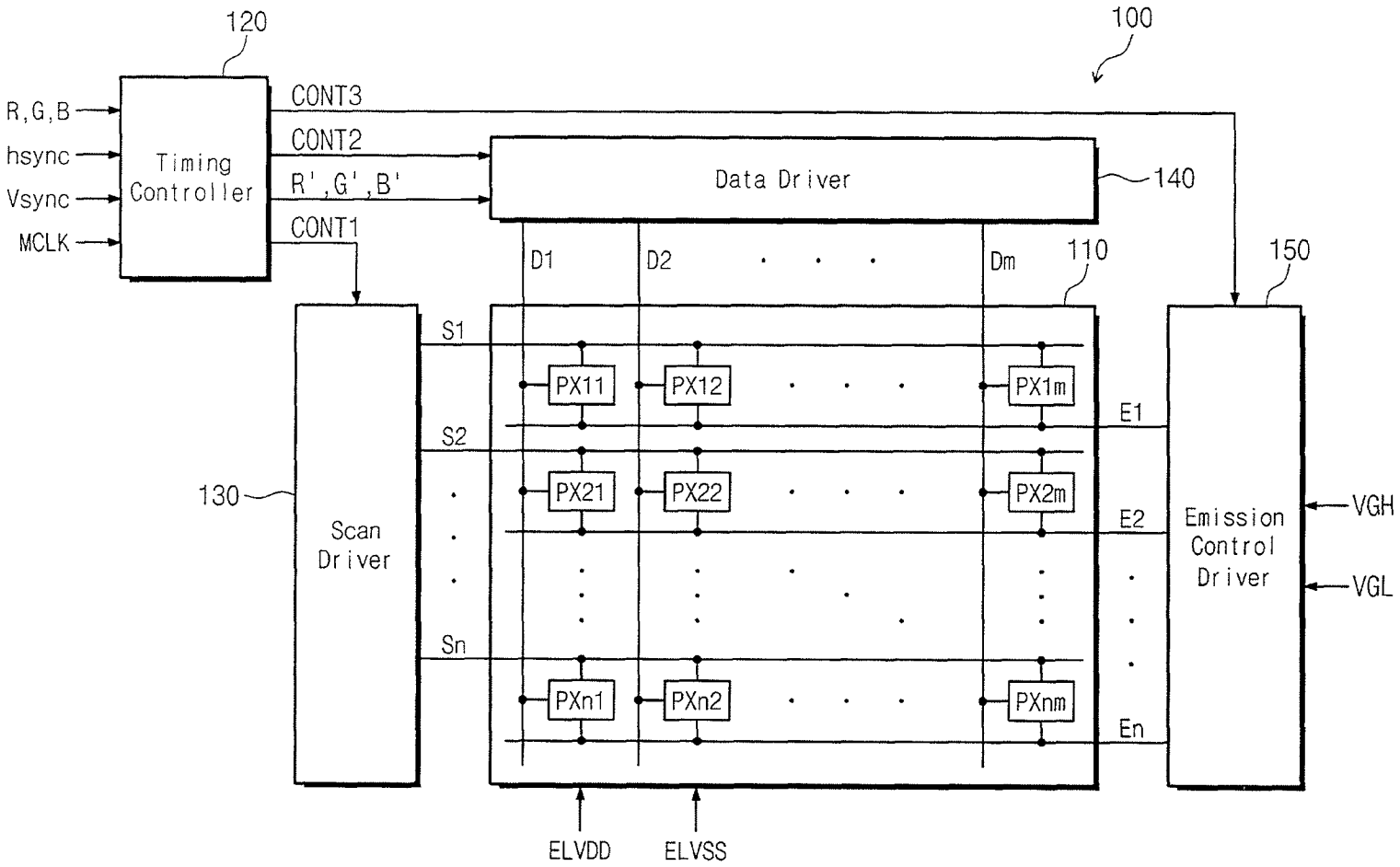
FIG. 1 illustrates a block diagram of an organic light emitting display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

It will be understood that when an element or layer is referred to as being "on", "connected to" or "coupled to" another element or layer, it can he directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the embodiments. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be explained in detail with reference to the accompanying drawings.

FIG. 1 illustrates a block diagram of an organic light emitting display device according to an embodiment. Referring to FIG. 1, an organic light emitting display device 100 includes a display panel 110, a timing controller 120, a scan driver 130, a data driver 140, and an emission control driver 150.

The display panel 110 may include a plurality of pixels PX11 to PXnm arranged in a matrix form. Each of the pixels PX11 to PXnm is connected to a corresponding scan line of scan lines S1 to Sn that extend in a row direction and a corresponding data line of data lines D1 to Dm crossing the scan lines S1 to Sn. In addition, each of the pixels PX 11 to PXnm is connected to a corresponding emission control line of emission control lines E1 to En that extend substantially in parallel to the scan lines S1 to Sn.

The scan lines S1 to Sn are connected to the scan driver 130 to receive scan signals. The data lines D1 to Dm are connected to the data driver 140 to receive data voltages. The emission control lines E1 to En are connected to the emission control driver 150 to receive emission control signals. In the present exemplary embodiment, each of "n" and "m" is an integer number greater than zero (0).

The timing controller 120 may receive image signals, e.g., R, G, and B, and control signals from an external source (not shown), e.g., a system board. The control signals may include a horizontal synchronization signal Hsync, a vertical synchronization signal Vsync, and a main clock signal MCLK.

The timing controller 120 converts a data format of the image signals R, G, and B to a data format appropriate to an interface between the data driver 140 and the timing controller 120. The timing controller 120 provides the converted image signals R', G', and B' to the data driver 140.

The timing controller 120 generates a first control signal CONT1, a second control signal CONT2, and a third control signal CONT3 in response to the control signals. The first control signal CONT1, the second control signal CONT2, and the third control signal CONT3 are used to control operating timings of the scan driver 130, the data driver 140, and the emission control driver 150, respectively. The timing controller 120 applies the first, second, and third control signals CONT1, CONT2, and CONT3 to the scan driver 130, the data driver 140, and the emission control driver 150, respectively.

The scan driver 130 generates the scan signals in response to the first control signal CONT1. The scan signals are sequentially applied to the pixels PX11 to PXnm in the unit of row through the scan lines S1 to Sn. Accordingly, the pixels PX11 to PXnm are sequentially selected in the unit of row.

The data driver 140 generates the data voltages corresponding to the image signals R', G', and B' in response to the second control signal CONT2. The data voltages are applied to the pixels PX11 to PXnm respectively through the data lines D1 to Dm.

The third control signal CONT3 used to control the emission control driver 150 includes a plurality of sub-control signals. The sub-control signals may include a start signal FLM, a first clock signal CLK1, and a second clock signal CLK2.

The emission control driver 150 is applied with a first voltage VGL and a second voltage VGH having a voltage level higher than that of the first voltage VGL. The emission control driver 150 generates the emission control signals in response to the third control signal CONT3. In detail, the emission control driver 150 generates the emission control signals using the start signal FLM, the first clock signal CLK1, the second clock signal CLK2, the first voltage VGL, and the second voltage VGH. The operation of the emission control driver 150 will be described in detail later. The emission control signals are applied to the pixels PX11 to PXnm through the emission control lines E1 to En.

The pixels PX11 to PXnm are applied with a first emission voltage ELVDD and a second emission voltage ELVSS. Each of the pixels PX11 to PXnm is applied with a corresponding data voltage of the data voltages through the corresponding data line of the data lines D1 to Dm in response to the corresponding scan signal provided through the corresponding scan line of the scan lines S1 to Sn. Each of the pixels PX11 to PXnm emits light at a brightness corresponding to the data voltage by using the first emission voltage ELVDD and the second emission voltage ELVSS. This will be described in detail later. An emission time period of each of the pixels PX11 to PXnm is controlled by the emission control signals.

The light emission driver 150 may generate the emission control signals using only the start signal FLM, the first clock signal CLK1, the second clock signal CLK2, the first voltage VGL, and the second voltage VGH. In other words, no additional control signals are required to initialize the emission control driver 150. Accordingly, the configuration of the emission control driver 150 may be simplified.

Figure 2:
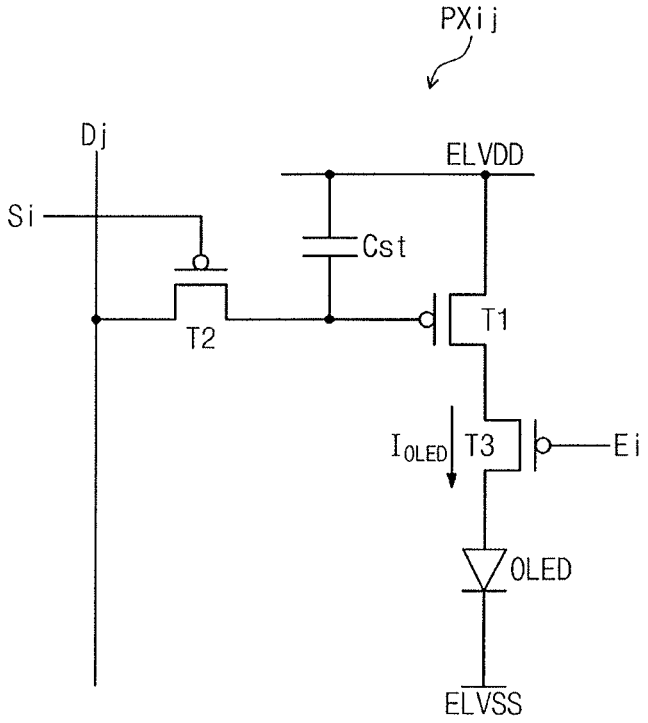
FIG. 2 illustrates an equivalent circuit diagram showing an example of one pixel of pixels shown in FIG. 1.

FIG. 2 illustrates an equivalent circuit diagram showing an example of one pixel of the pixels shown in FIG. 1. Since the pixels PX11 to PXnm have the same configuration and function, only one pixel PXij has been shown in FIG. 2. Thus, hereinafter, an operation of one pixel PXij will be described in detail.

Referring to FIG. 2, the pixel PXij may include an organic light emitting diode OLED, a driving transistor T1, a capacitor Cst, a switching transistor T2, and an emission control transistor T3. The driving transistor T1 has a source terminal applied with the first emission voltage ELVDD, a drain terminal connected to a source terminal of the emission control transistor T3, and a gate terminal connected to a drain electrode of the switching transistor T2. The switching transistor T2 has a gate terminal connected to the corresponding scan line Si and a source terminal connected to the corresponding data line Dj.

The switching transistor T2 is turned on in response to the scan signal provided through the scan line Si. The turned-on switching transistor T2 receives the data voltage through the data line Dj and applies the data voltage to the gate terminal of the driving transistor T1.

The capacitor Cst has a first electrode connected to the source terminal of the driving transistor T1 and a second electrode connected to the gate terminal of the driving transistor T1. The capacitor Cst is charged with the data voltage applied to the gate terminal of the driving transistor T1 and maintains the charged data voltage after the switching transistor T2 is turned off.

The emission control transistor T3 has a gate terminal connected to the corresponding emission control line Ei and a drain terminal connected to an anode electrode of the organic light emitting diode OLED. The emission control transistor T3 is turned on in response to the emission control signal provided through the emission control line Ei. The turned-on emission control transistor T3 transfers a current $I_{OLED}$, which flows through the driving transistor T1, to the organic light emitting diode OLED.

The organic light emitting diode OLED is applied with the second emission voltage ELVSS through a cathode electrode thereof. The organic light emitting diode OLED emits the light of various intensities in accordance with an amount of the current $I_{OLED}$ provided from the driving transistor T1 through the emission control transistor T3.

Figure 3:
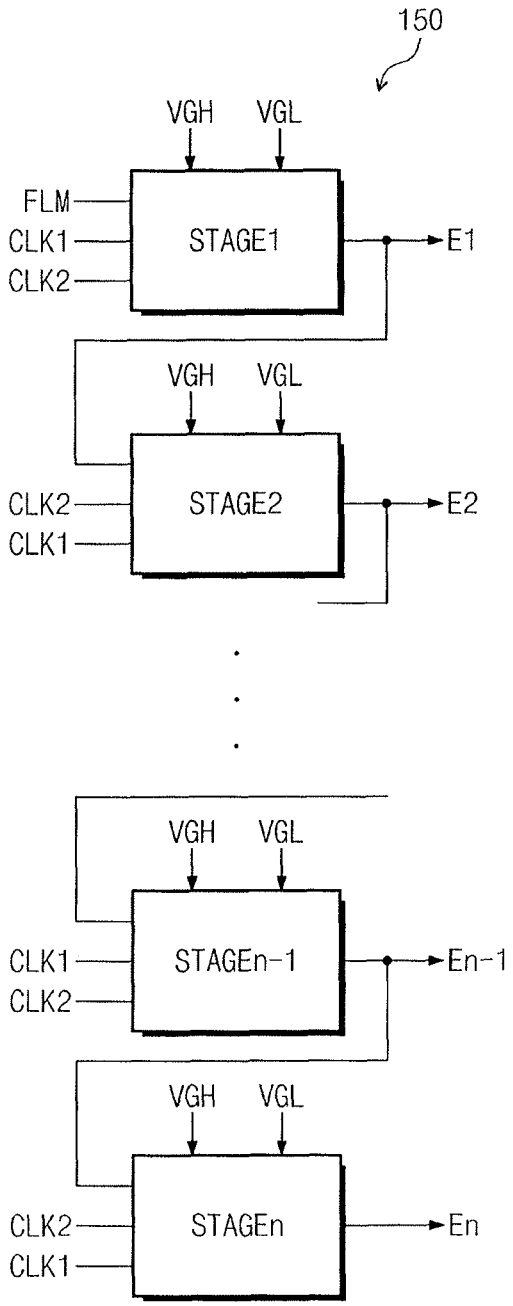
FIG. 3 illustrates a block diagram of an emission control driver shown in FIG. 1.

FIG. 3 illustrates a block diagram showing the emission control driver shown in FIG. 1. Referring to FIG. 3, the emission control driver 150 includes a plurality of stages STAGE1 to STAGEn connected to each other one after another to sequentially output the emission control signals. The stages STAGE1 to STAGEn are connected to the emission control lines E1 to En, respectively, and sequentially output the emission control signals. The emission control signals overlap each other during a predetermined period. Hereinafter, the emission control signals output through the emission control lines E1 to En are referred to as first to n-th emission control signals.

Each of the stages STAGE1 to STAGEn receives the first voltage VGL and the second voltage VGH having the voltage level higher than that of the first voltage VGL. In addition, each of the stages STAGE1 to STAGEn receives the first clock signal CLK1 and the second clock signal CLK2.

Among the stages STAGE1 to STAGEn, a first stage STAGE1 is driven in response to the start signal FLM. In detail, the first stage STAGE1 receives the first voltage VGL and the second voltage VGH and generates the first emission control signal in response to the start signal FLM, the first clock signal CLK1, and the second clock signal CLK2. The first emission control signal is applied to the pixels arranged in a corresponding row through the first emission control line E1.

The stages STAGE2 to STAGEn are connected to each other one after another and are sequentially driven. In detail, a present stage is connected to an output terminal of a pervious stage and receives the emission control signal output from the previous stage. The present stage is driven in response to the emission control signal provided from the previous stage.

For instance, a second stage STAGE2 may receive the first emission control signal output from the first stage STAGE1 and is driven in response to the first emission control signal. In detail, the second stage STAGE2 receives the first voltage VGL and the second voltage VGH and generates the second emission control signal in response to the first emission control signal, the first clock signal CLK1, and the second clock signal CLK2. The second emission control signal is applied to the pixels arranged in a corresponding row through the second emission control line E2. The other stages STAGE3 to STAGEn are driven in the same way as the second stage STAGE2, and thus details thereof will not be repeated.

Figure 4:
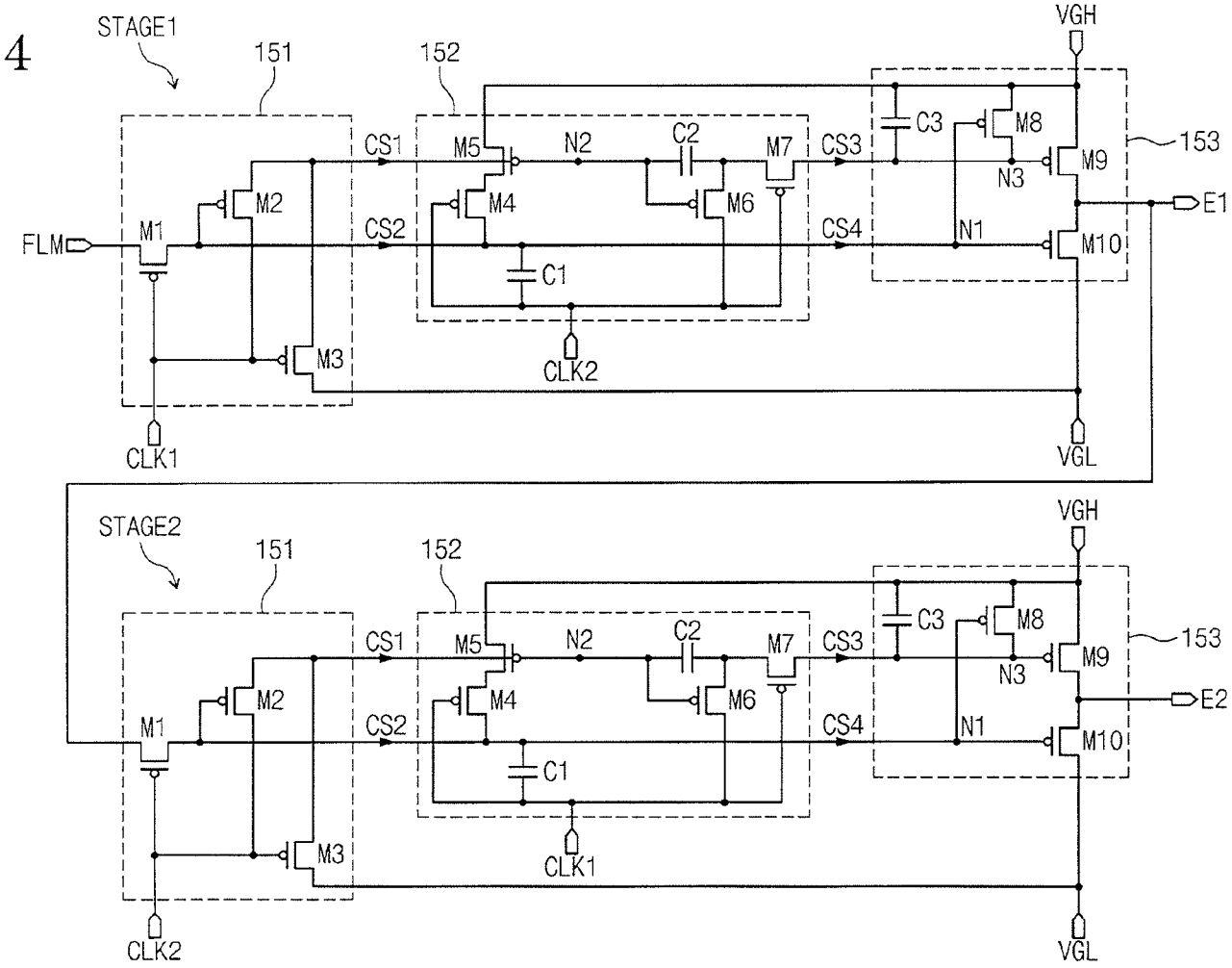
FIG. 4 illustrates a circuit diagram of stages of an emission control driver of an organic light emitting display device according to a first exemplary embodiment.

FIG. 4 illustrates a circuit diagram of stages of an emission control driver of an organic light emitting display device according to a first exemplary embodiment. FIG. 4 shows the circuit diagram of the first stage STAGE1 and the second stage STAGE2, but the stages STAGE1 to STAGEn have the same circuit configuration and function. Thus, hereinafter, the circuit configuration and the operation of the first stage STAGE1 will be described in detail, and the circuit configuration and the operation of the other stages STAGE2 to STAGEn will not be repeated in order to avoid redundancy. Referring to FIG. 4, each of the stages STAGE1 to STAGEn may include a first signal processor 151, a second signal processor 152, and a third signal processor 153.

The first signal processor 151 of each of the stages STAGE1 to STAGEn is applied with a first sub-control signal and a second sub-control signal. In detail, the first signal processor 151 of each of the stages STAGE2 to STAGEn receives the emission control signal output from the previous stage as the first sub-control signal. The first signal processor 151 of the first stage STAGE1 receives the start signal FLM as the first sub-control signal.

In addition, the first signal processor 151 of each of odd-numbered stages STAGE1, STAGE3. . . . , and STAGEn−1 receives the first clock signal CLK1 as the second sub-control signal. The first signal processor 151 of each of even-numbered stages STAGE2, STAGE4. . . . , and STAGEn receives the second clock signal CLK2 as the second sub-control signal.

Accordingly, the first signal processor 151 receives the first voltage VGL and generates a first signal CS1 and a second signal CS2 in response to the first and second sub-control signals. The first signal CS1 and the second signal CS2 are applied to the second signal processor 152.

The first signal processor 151 of the first stage STAGE1 receives the first voltage VGL and generates the first signal CS1 and the second signal CS2 in response to the start signal FLM and the first clock signal CLK1. The first signal processor 151 applies the first signal CS1 and the second signal CS2 to the second signal processor 152.

The first signal processor 151 may include first, second, third transistors M1, M2, and M3. The first, second, and third transistors M1, M2, and M3 may be PMOS transistors.

The first transistor M1 has a source terminal applied with the start signal FLM, a gate terminal applied with the first clock signal CLK1, and a drain terminal connected to a gate terminal of the second transistor M2.

The second transistor M2 has the gate terminal connected to the drain terminal of the first transistor M1, a source terminal connected to a source terminal of the third transistor M3, and a drain has applied with the first clock signal CLK1.

The third transistor M3 has a gate terminal applied with the first clock signal CLK1 and connected to the drain terminal of the second transistor M2, a source terminal connected to the source terminal of the second transistor M2, and a drain terminal applied with the first voltage VGL.

The first signal CS1 is output from the source terminals of the second and third transistors M2 and M2, which are connected to each other. The second signal CS2 is output from the drain terminal of the first transistor M1.

The second signal processor 152 of each of the stages STAGE1 to STAGEn is applied with a third sub-control signal. In detail, the second signal processor 152 of each of the odd-numbered stages STAGE1, STAGE3, . . . , and STAGEn−1 receives the second clock signal CLK2 as the third sub-control signal. The second signal processor 152 of each of the even-numbered stages STAGE2, STAGE4, . . . , and STAGEn receives the first clock signal CLK1 as the third sub-control signal.

The second signal processor 152 receives the second voltage VGH and generates a third signal CS3 and a fourth signal CS4 in response to the third sub-control signal, the first signal CS1, and the second signal CS3. The third signal CS3 and the fourth signal CS4 are applied to the second signal processor 152.

The second signal processor 152 of the first stage STAGE1 receives the second voltage VGH and generates the third signal CS3 and the fourth signal CS4 in response to the first and second signals CS1 and CS2 from the first signal processor 151 and the second clock signal CLK2. The second signal processor 152 applies the third signal CS3 and the fourth signal CS4 to the third signal processor 153.

The second signal processor 152 may include fourth, fifth, sixth, and seventh transistors M4, M5, M6, and M7 and first and second capacitors C1 and C2. The fourth to seventh transistors M4 to M7 may be PMOS transistors.

The fourth transistor M4 has a gate terminal applied with the second clock signal CLK2, a drain terminal connected to a first node N1 and the gate terminal of the second transistor M2, and a source terminal connected to a drain terminal of the fifth transistor M5.

The first capacitor C1 has a first electrode applied with the second clock signal CLK2 and a second electrode connected to the drain terminal of the fourth transistor M4 and the first node N1.

The fifth transistor M5 has a gate terminal connected to the source terminal of the third transistor M3 and a second node N2, a source terminal applied with the second voltage VGH, and a drain terminal connected to the source terminal of the fourth transistor M4.

The sixth transistor M6 has a gate terminal connected to the second node N2, a source terminal connected to a drain terminal of the seventh transistor M7, and a drain terminal applied with the second clock signal CLK2.

The second capacitor C2 has a first electrode connected to the gate terminal of the sixth transistor M6 and a second electrode connected to the source terminal of the sixth transistor M6.

The seventh transistor M7 has a gate terminal applied with the second clock signal CLK2, a source terminal connected to a third node N3, and the drain terminal connected to the source terminal of the sixth transistor M6.

The third signal CS3 is applied to the third node N3 and the fourth signal CS4 is applied to the first node N1.

The third signal processor 153 of the first stage STAGE1 receives the first voltage VGL and the second voltage VGH, and generates the first emission control signal in response to the third signal CS3 and the fourth signal CS4 provided from the second signal processor 152. The first emission control signal is applied to the pixels through the first emission control line E1. The first emission control signal is applied to the first signal processor 151 of the second stage STAGE2.

The third signal processor 153 includes eighth, ninth, and tenth transistors M8, M9, and M10 and a third capacitor C3. The eight, ninth, and tenth transistors M8, M9, and M10 are PMOS transistors.

The eighth transistor M8 has a gate terminal connected to the first node N1, a source terminal applied with the second voltage VGH, and a drain electrode connected to the third node N3.

The third capacitor C3 has a first electrode applied with the second voltage VGH and a second electrode connected to the third node N3.

The ninth transistor M9 has a gate terminal connected to the third node N3, a source terminal applied with the second voltage VGH, and a drain terminal connected to the first emission control line E1.

The tenth transistor M10 has a gate terminal connected to the first node N1, a source terminal connected to the first emission control line E1, and a drain terminal applied with the first voltage VGL.

The drain terminal of the ninth transistor M9 and the source terminal of the tenth transistor M10 are connected to the source terminal of the first transistor M1 of the first signal processor 151 of the second stage STAGE2.

The operation of the first to tenth transistors M1 to M10 by the start signal FLM, the first clock signal CLK1, and the second clock signal CLK2 will be described in detail with reference to FIG. 5.

Figure 5:
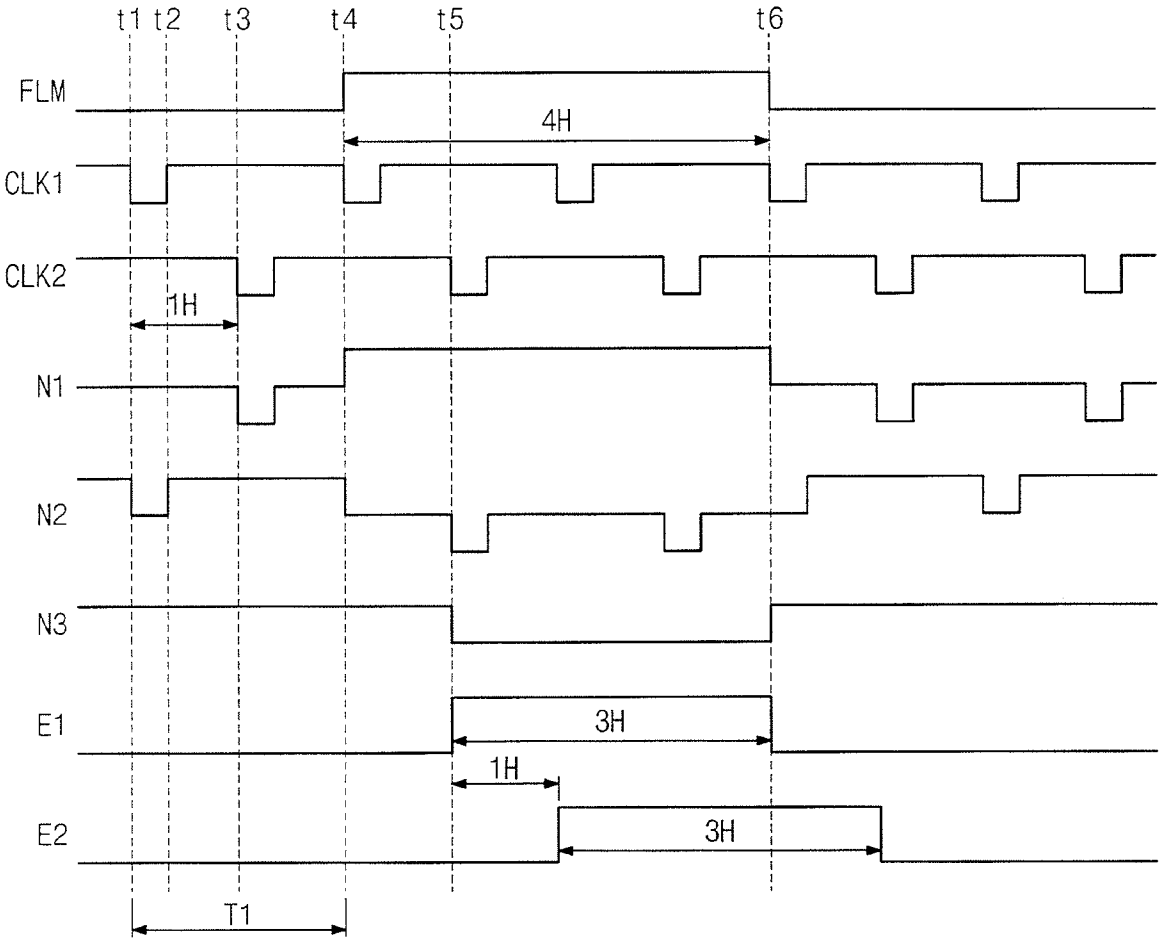
FIG. 5 illustrates a timing diagram of an operation of a first stage shown in FIG. 4.

FIG. 5 illustrates a timing diagram showing the operation of the first stage shown in FIG. 4. Referring to FIG. 5, the first clock signal CLK1 and the second clock signal CLK2 have the same frequency. That is, the first and second clock signals CLK1 and CLK2 have the same first period T1. The second clock signal CLK2 is obtained by shifting the first clock signal CLK1 by a half of the first period T1 of the first clock signal CLK1. The shift period between the first clock signal CLK1 and the second clock signal CLK2 is referred to as a first duration 1H.

The start signal FLM is applied to only the first stage STAGE1 and a high level duration of the start signal FLM is referred to as a second duration 4H. The second duration 4H is two times greater than the first period T1 of the first and second clock signals CLK1 and CLK2. That is, the second duration 4H is four times greater than the first duration 1H.

The start signal FLM changes from a low level to a high level when the first clock signal CLK1 changes from the high level to the low level. As described above, the start signal FLM maintains the high level during the second duration 4H after being changing from the low level to the high level. That is, the start signal FLM is activated when the first clock signal CLK1 changes from the high level to the low level, and the activated state of the start signal FLM is maintained during the second duration 4H.

Hereinafter, a high level of each signal is referred to as a first level and a low level, lower than the high level, of each signal is referred to as a second level. In addition, the first voltage VGL has the second level and the second voltage VGH has the first level.

The start signal FLM and the first clock signal CLK1 have the second level at a first time point t1 and the second clock signal CLK2 has the first level at the first time point t1.

The first clock signal CLK1 having the second level is applied to the gate terminal of the first transistor M1 and the gate terminal of the third transistor M3. Accordingly, the first and third transistors M1 and M3 are turned on.

The start signal FLM having the second level is applied to the gate terminal of the second transistor M2 and the first node N1 through the turned-on first transistor M1. Thus, the second transistor M2 is turned on and a voltage at the first node N1 has the second level.

The first clock signal CLK1 having the second level and the first voltage VGL are applied to the second node N2 respectively through the turned-on second transistor M2 and the turned-on third transistor M3. Therefore, a voltage at the second node N2 has the second level.

The second clock signal CLK2 having the first level is applied to the fourth transistor M4 and the seventh transistor M7. Thus, the fourth and seventh transistors M4 and M7 are turned off.

Since the voltage at the first node N1 has the second level, the eighth transistor M8 is turned on. The second voltage VGH is applied to the third node N3 through the turned-on eighth transistor M8. Accordingly, a voltage at the third node N3 has the first level. The third capacitor C3 is charged with the second voltage VGH. In other words, the third capacitor C3 is charged with the voltage having the first level. Since the voltage at the third node N3 has the first level, the ninth transistor M9 is turned off.

Since the voltage at the first node N1 has the second level, the tenth transistor M10 is turned on. Due to the turned-on tenth transistor M10, the first voltage VGL is applied to the first emission control line E1. Thus, the first emission control signal has the second level.

At a second time point t2, the start signal FLM has the second level and the first and second clock signals CLK1 and CLK2 have the first level. The first and third transistors M1 and M3 are turned off by the first clock signal CLK1 having the first level.

Since the voltage at the first node N1 is maintained at the second level, the second transistor M2 is turned on. The first clock signal CLK1 having the first level is applied to the second node N2 through the turned-on second transistor M2. Accordingly, the voltage at the second node N2 has the first level.

The voltage at the first node N1 has the second level, and thus the eighth and tenth transistors M8 and M10 are turned on. The second voltage VGH is applied to the third node N3 through the turned-on eighth transistor M8, so that the voltage at the third node N3 is maintained at the first level.

The ninth transistor M9 is turned off and the tenth transistor M10 is turned on since the voltage at the third node N3 has the first level and the voltage at the first node N1 has the second level. Accordingly, the first emission control signal is maintained at the second level.

At a third time point t3, the second clock signal CLK2 changes from the first level to the second level, and then changes from the second level to the first level again. Thus, an electric potential at the first node N1 is boot-strapped by a variation of electric potential of the second clock signal CLK2 due to the coupling of the first capacitor C1. That is, the first node N1, which has the voltage with the second level at the second time point t2, has a voltage of a third level lower than the second level in the second level period of the second clock signal CLK2 due to the coupling of the first capacitor C1. A conventional PMOS transistor has good drive characteristics as the level of the voltage applied to the PMOS transistor becomes low. Since the voltage at the first node N1 has the third level lower than the second level in the second level period of the second clock signal CLK2, the drive characteristics of the eighth and tenth transistors M8 and M10 may be improved. The first emission control signal is maintained at the second level.

At a fourth time point t4, the start signal FLM and the second clock signal CLK2 have the first level and the first clock signal CLK1 has the second level.

The first transistor M1 is turned on by the first clock signal CLK1 having the second level and the start signal FLM having the first level is applied to the first node N1. The voltage at the first node N1 has the first level, and thus the second and the tenth transistors M2 and M10 are turned off.

The third transistor M3 is turned on in response to the first clock signal CLK1 having the second level and the first voltage VGL is applied to the second node N2. Thus, the voltage at the second node N2 has the second level.

The seventh transistor M7 is turned off in response to the second clock signal CLK2 having the first level. Since the voltage at the first node N1 has the first level, the eighth transistor M8 is turned off. The voltage at the third node N3 is maintained at the first level by the third capacitor C3. The voltage at the third node N3 is maintained at the first level, and thus the ninth transistor M9 is turned off. Therefore, the first emission control signal is maintained at the second level.

At a fifth time point t5, the start signal FLM and the first clock signal CLK1 have the first level, and the second clock signal CLK2 has the second level.

The first and third transistors M1 and M3 are turned off by the first clock signal CLK1 having the first level. Since the voltage at the first node N1 is maintained at the first level, the second, eighth, and tenth transistors M2, M8, and M10 are turned off.

The fourth and seventh transistors M4 and M7 are turned on in response to the second clock signal CLK2 having the second level. In addition, the voltage at the second node N2 has the second level, so that the fifth and sixth transistors M5 and M6 are turned on.

As the boot-strap described above, the electric potential of the second node N2 is boot-strapped by the variation of the electric potential of the second clock signal CLK2 due to the coupling of the second capacitor C2. That is, the voltage at the second node N2 has the third level lower than the second level in the second level period of the second clock signal CLK2.

The second clock signal CLK2 having the second level is applied to the third node N3 through the turned-on sixth and seventh transistors M6 and M7. Accordingly, the voltage at the third node N3 has the second level at the fifth time point t5. Since the voltage at the third node N3 has the second level, the ninth transistor M9 is turned on.

The first emission control signal is maintained at the first level since the ninth transistor M9 is turned on and the tenth transistor M10 is turned off.

At a sixth time point t6, the start signal FLM and the first clock signal CLK1 have the second level and the second clock signal CLK2 has the first level. According to the operation at the first time point t1, the first emission control signal has the second level at the sixth time point t6.

A duration in which the first emission control signal has the first level is referred to as a third duration 3H. The third duration 3H is three times greater than the first duration 1H.

The first emission control signal is applied to the pixels through the second stage STAGE2 and the first emission control line E1. The second stage STAGE2 generates the second emission control signal in response to the first emission control signal, the first clock signal CLK1, and the second clock signal CLK2.

The second emission control signal is output after being shifted by the first duration 1H with respect to the first emission control signal. In other words, the emission control signals output from the stages STAGE1 to STAGEn are sequentially shifted by the first duration 1H. In detail, the emission control signal output from the present stage is obtained by shifting the emission control signal output from the previous stage by the first duration 1H.

Consequently, the emission control driver 150 of the organic light emitting display device according to the first exemplary embodiment receives the first voltage VGL and the second voltage VGH and generates the emission control signals in response to the start signal FLM, the first clock signal CLK1, and the second clock signal CLK2. Thus, the configuration of the emission control driver 150 may be simplified.

Figure 6:
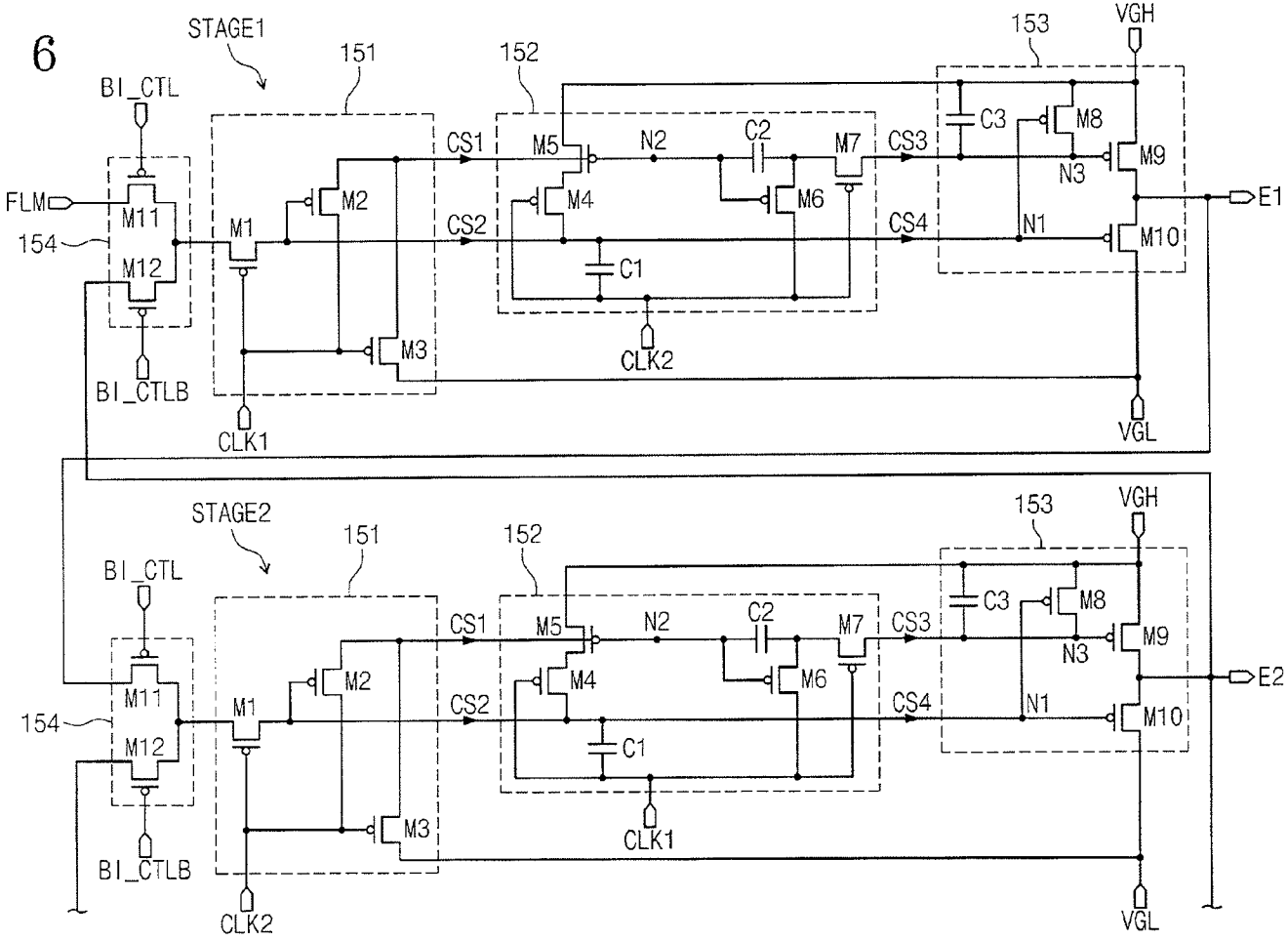
FIGS. 6 and 7 illustrate circuit diagrams of stages of an emission control driver of an organic light emitting display device according to a second exemplary embodiment.
Figure 7:
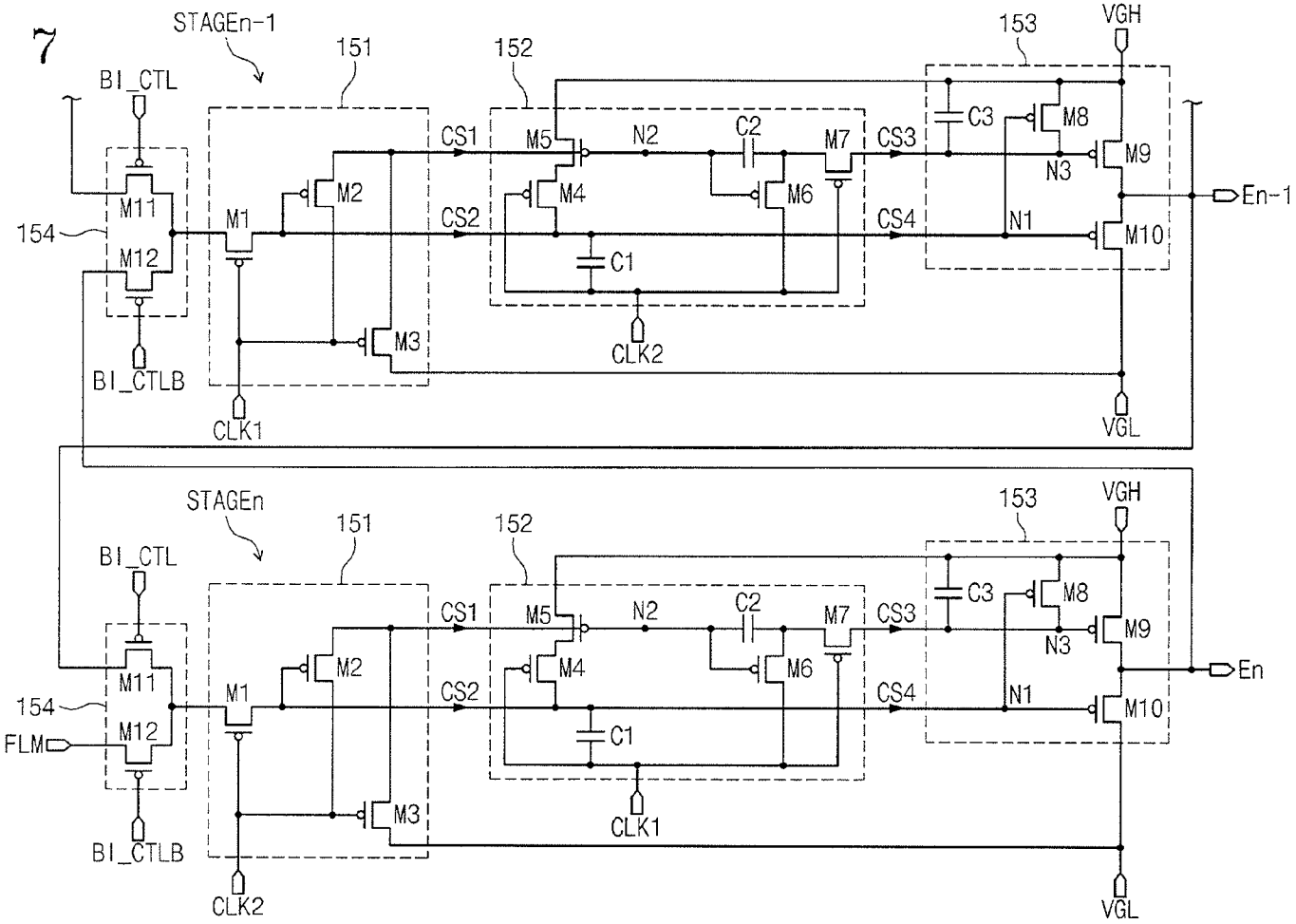

FIGS. 6 and 7 illustrate circuit diagrams of stages of an emission control driver of an organic light emitting display device according to a second exemplary embodiment.

FIG. 6 shows a first stage STAGE1 and a second stage STAGE2 and FIG. 7 shows an (n−1)th stage STAGEn−1 and an n-th stage STAGEn. However, the stages STAGE1 to STAGEn have the same circuit configuration and function. The stages shown in FIGS. 6 and 7 are driven in the same way as the stages shown in FIG. 4 except that the stages shown in FIGS. 6 and 7 include a bi-directional driver. Accordingly, hereinafter, different circuit configurations front those of the stages shown in FIG. 4 will be described.

Referring to FIGS. 6 and 7, the bi-directional driver 154 of each of the stages STAGE1 to STAGEn receives a first direction control signal BI_CTL and a second direction control signal BI_CTLB. The bi-directional driver 154 outputs a first input signal or a second input signal as a first sub-control signal in response to the first direction control signal BI_CTL and the second direction control signal BI_CTLB.

In detail, the bi-directional driver 154 of a present stage receives an emission control signal output from a previous stage as the first input signal and an emission control signal output from a next stage as the second input signal. In addition, the bi-directional driver 154 of the first stage STAGE1 receives the start signal FLM as the first input signal, and the n-th stage STAGEn receives the start signal FLM as the second input signal.

For instance, the first emission control signal output from the first stage STAGE1 is applied to the next stage, i.e., the second stage STAGE, since there is no previous stage of the first stage STAGE1. The second emission control signal output from the second stage STAGE2 is applied to the next stage, i.e., the third stage STAGE3, and the previous stage, i.e., the first stage STAGE1. The n-th emission control signal output from the n-th stage STAGEn is applied to the previous stage, i.e., the (n−1)th stage STAGEn−1, since there is no next stage of the n-th stage STAGEn. The (n−1)th emission control signal output from the (n−1)th stage STAGEn−1 is applied to the next stage, i.e., the n-th stage STAGEn, and the previous stage, i.e., the (n−2)th stage STAGEn−2.

The bi-directional driver 154 includes an eleventh transistor M11 and a twelfth transistor M12.

The eleventh transistor M11 includes a gate terminal applied with the first direction control signal BI_CTL and a source terminal applied with the first input signal. The twelfth transistor M12 includes a gate terminal applied with the second direction control signal BI_CTLB and a source terminal applied with the second input signal. Drain terminals of the eleventh and twelfth transistors M11 and M12 are connected to the source terminal of the first transistor M1 of the first signal processor 151.

In the first stage STAGE1, the gate terminal of the eleventh transistor M11 of the bi-directional driver 154 receives the first direction control signal BI_CTL and the source terminal of the eleventh transistor M11 of the bi-directional driver 154 receives the start signal FLM. The gate terminal of the twelfth transistor M12 receives the second direction control signal BI_CTLB and the source terminal of the twelfth transistor M12 receives the second emission control signal output from the second sage STAGE2. The drain terminals of the eleventh and twelfth transistors M11 and M12 are connected to the source terminal of the first transistor M1.

In the n-th stage STAGEn, the gate terminal of the eleventh transistor M11 of the bi-directional driver 154 receives the first direction control signal BI_CTL and the source terminal of the eleventh transistor M11 of the bi-directional driver 154 receives the (n−1)th emission control signal output from the (n−1)th stage STAGEn−1. The gate terminal of the twelfth transistor M12 receives the second direction control signal BI_CTLB and the source terminal of the twelfth transistor M12 receives the start signal FLM. The drain terminals of the eleventh and twelfth transistors M11 and M12 are connected to the source terminal of the first transistor M1.

In the other stages STAGE2 to STAGEn−1, the gate terminal of the eleventh transistor M11 of the bi-directional driver 154 receives the first direction control signal BI_CTL and the source terminal of the eleventh transistor M11 of the bi-directional driver 154 receives the emission control signal output from the previous stage. The gate terminal of the twelfth transistor M12 receives the second direction control signal BI_CTLB and the source terminal of the twelfth transistor M12 receives the emission control signal output from the next stage. The drain terminals of the eleventh and twelfth transistors M11 and M12 are connected to the source terminal of the first transistor M1.

The first direction control signal BI_CTL and the second direction control signal BI_CTLB have different levels from each other. For instance, when the first direction control signal BI_CTL has a first level (or a high level), the second direction control signal BI_CTLB has a second level (or a low level) lower than the first level.

When the first direction control signal BI_CTL has the second level, the eleventh transistor M11 of the bi-directional driver 154 of each of the stages STAGE1 to STAGEn is turned on and the twelfth transistor M12 of the bi-directional driver 154 of each of the stages STAGE1 to STAGEn is turned off. Accordingly, the start signal FLM is applied to the bi-directional driver 154 of the first stage STAGE1. In addition, the second emission control signal output from the first stage STAGE1 is applied to the second stage STAGE2. That is, the stages STAGE1 to STAGEn of the emission control driver according to the second exemplary embodiment are driven in the same way as the stages shown in FIG. 4. The emission control signals output from the stages STAGE1 to STAGEn are sequentially applied to the pixels in the order from the first emission control signal to the n-th emission control signal. Accordingly, the pixels are driven in the order from the upper portion of the display panel 110 to the lower portion of the display panel 110.

In the case that the second direction control signal BI_CTLB has the second level, the eleventh transistor M11 of the bi-directional driver 154 of each of the stages STAGE1 to STAGEn is turned off and the twelfth transistor M12 of the bi-directional driver 154 of each of the stages STAGE1 to STAGEn is turned on. Accordingly, the start signal FLM is applied to the bi-directional driver 154 of the n-th stage STAGEn. In addition, the n-th emission control signal output from the n-th stage STAGEn is applied to the (n−1)th stage STAGEn−1. Therefore, the emission control signals output from the stages STAGE1 to STAGEn are sequentially applied to the pixels in the order from the n-th emission control signal to the first emission control signal. Accordingly, the pixels are driven in the order from the lower portion of the display panel 110 to the upper portion of the display panel 110.

The emission control driver of the organic light emitting display device according to the second exemplary embodiment receives the first voltage VGL and the second voltage VGH and generates the emission control signals in response to the start signal FLM, the first clock signal CLK1, and the second clock signal CLK2. Thus, the configuration of the emission control driver may be simplified.

Figure 8:
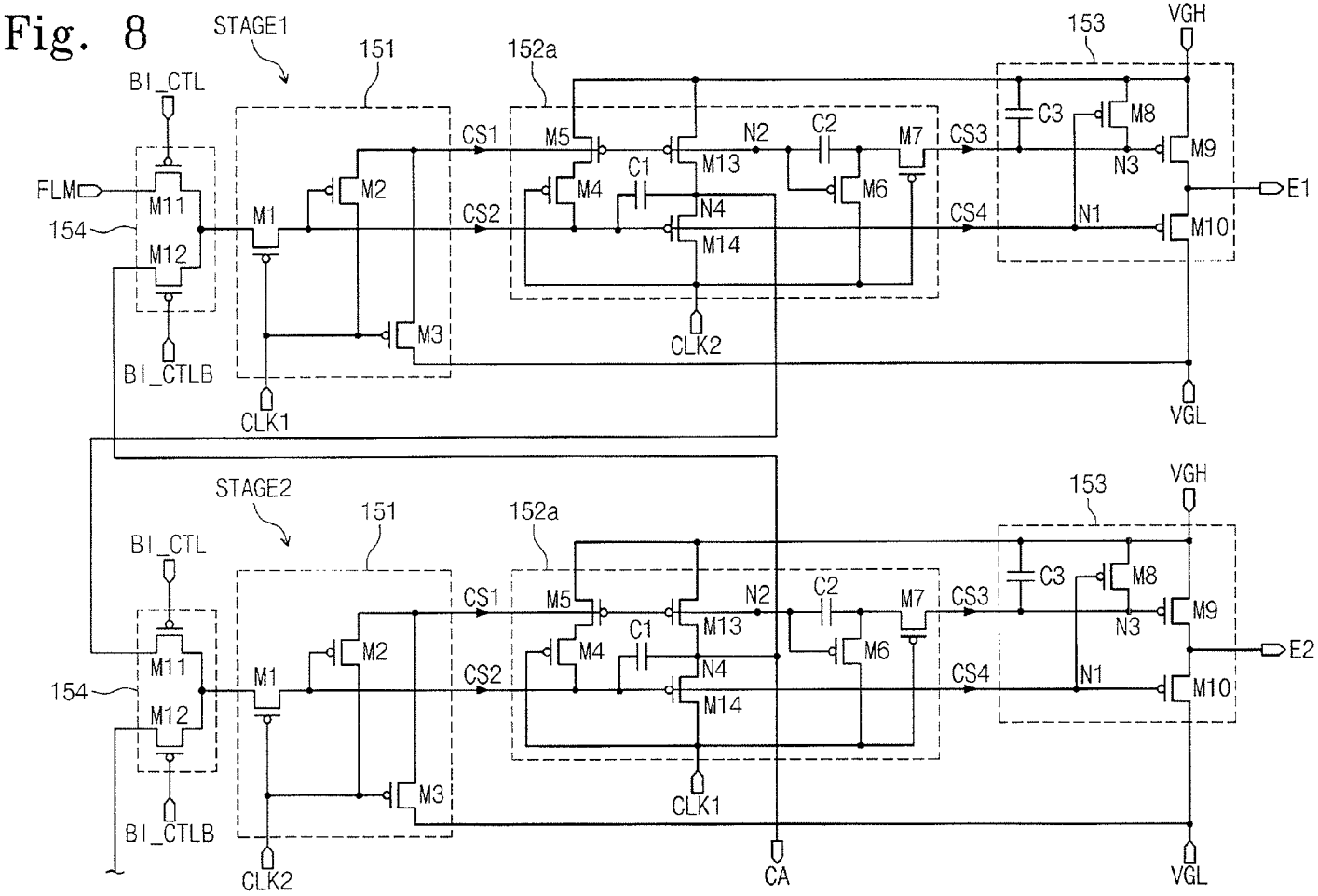
FIG. 8 illustrates a circuit diagram of stages of an emission control driver of an organic light emitting display device according to a third exemplary embodiment.

FIG. 8 illustrates a circuit diagram of stages of an emission control driver of an organic light emitting display device according to a third exemplary embodiment. FIG. 8 shows a first stage STAGE1 and a second stage STAGE2 of an emission control driver. However, the stages STAGE1 to STAGEn have the same circuit configuration and function. Thus, hereinafter, the first stage STAGE1 will be described in detail and detailed descriptions of the other stages STAGE2 to STAGEn are omitted.

The stages shown in FIG. 8 are driven in the same way as the stages shown in FIGS. 6 and 7 except for a second signal processor 152a. Accordingly, hereinafter, different circuit configurations from those of the stages shown in FIGS. 6 and 7 will be described.

Referring FIG. 8, the bi-directional driver 154 of each of the stages STAGE1 to STAGEn receives a carry signal CA output from a previous stage as a first input signal and a carry signal CA output from a next stage as a second input signal. In addition, the bi-directional driver 154 of the first stage STAGE1 receives a start signal FLM as the first input signal and the bi-directional driver 154 of the n-th stage STAGEn receives the start signal FLM as the second input signal.

The carry signal CA is output from the second signal processor 152a of each of the stages STAGE1 to STAGEn. In order to output the carry signal CA, the second signal processor 152 of each of the stages STAGE1 to STAGEn includes fourth to seventh transistors M4 to M7, first and second capacitors C1 and C2, and thirteenth and fourteenth transistors M13 and M14. The circuit configuration of the second signal processor 152a is the same as the second signal processor 152 shown in FIG. 4 except for the first capacitor C1, the thirteen transistor M13, and the fourteenth transistor M14. Thus, a connection between the first capacitor C1, the thirteenth transistor M13, and the fourteenth transistor M14 of the second signal processor 152 of the first stage STAGE1 will be described in detail.

The thirteenth transistor M13 has a gate terminal connected to the gate terminal of the fifth transistor M5 and the second node N2, a source terminal applied with the second voltage VGH, an a drain terminal connected to a fourth node N4.

The fourteenth transistor M14 has a gate terminal connected to the gate terminal of the fourth transistor M4, a source terminal connected to the fourth node N4, and a drain terminal applied with the second clock signal CLK2.

The first capacitor C1 has a first electrode connected to the gate terminal of the fourth transistor M4 and the gate terminal of the fourteenth transistor M14 and a second electrode connected to the fourth node N4.

A signal output from the fourth node N4 is defined as the carry signal CA and applied to the bi-directional driver 154 of the second stage STAGE2.

The carry signal CA of each of the stages STAGE1 to STAGEn is applied to the bi-directional driver 154 of each of the previous stage and the next stage. For instance, the carry signal CA output from the first stage STAGE1 is applied to the next stage, i.e., the bi-directional driver 154 of the second stage STAGE2, since the previous stage of the first stage STAGE1 does not exist. The carry signal CA output from the second stage STAGE2 is applied to the bi-directional driver 154 of the next stage, i.e., the third stage STAGE3, and to the bi-directional driver 154 of the previous stage, i.e., the first stage STAGE1.

The carry signal CA output from the n-th stage STAGEn is applied to the bi-directional driver 154 of the (n−1)th stage STAGEn−1 since the next stage of the n-th stage STAGEn does not exist. The carry signal CA output from the (n−1)th stage STAGEn−1 is applied to the bi-directional driver 154 of each of the n-th stage STAGEn and the (n−2)th stage STAGEn−2.

That is, each of the stages shown in FIG. 8 applies the carry signal CA to the previous and next stages thereof instead of the emission control signals used in the stages shown in FIGS. 6 and 7. Thus, the stages STAGE1 to STAGEn may be driven by using the carry signals rather than the emission control signals.

The output of the carry signal CA from the first stage STAGE1 by the thirteenth and fourteenth transistors M13 and M14 will be described in detail below with reference to FIG. 9. In addition, the second stage STAGE2 driven in response to the carry signal CA from the first stage STAGE1 will be described in detail later with reference to FIG. 10.

Figure 9:
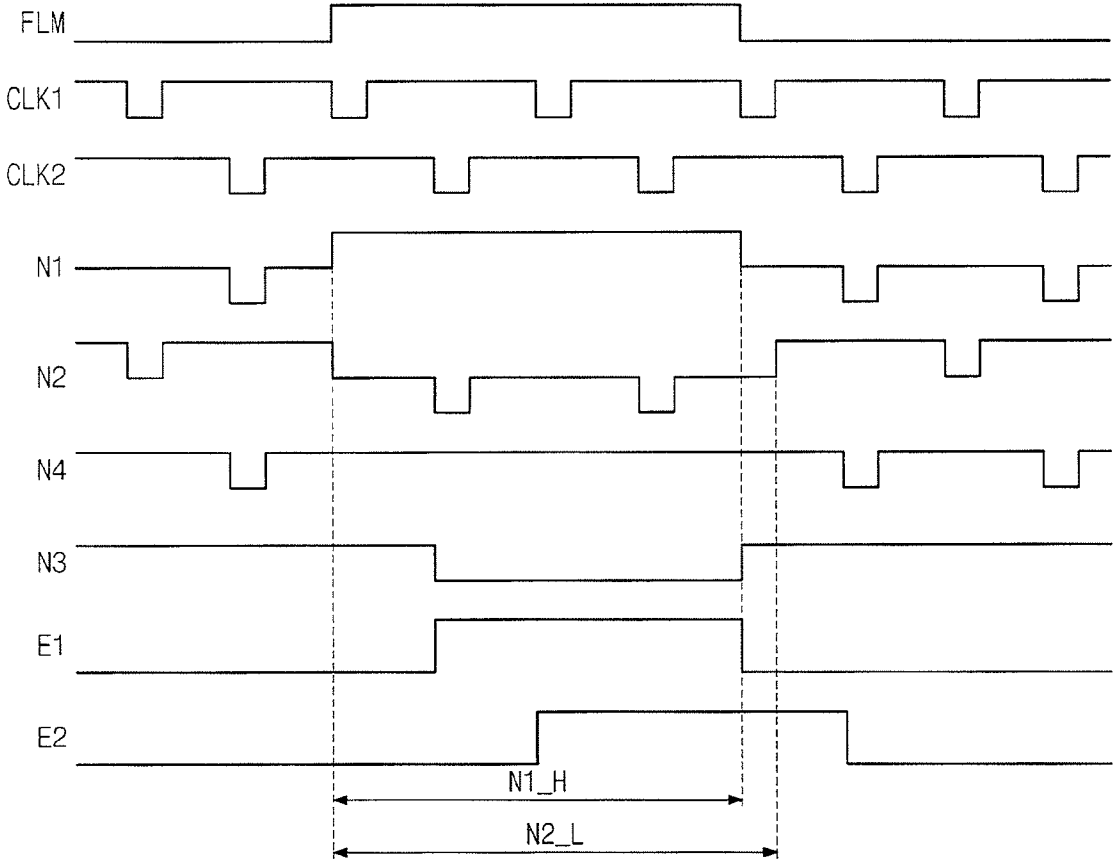
FIG. 9 illustrates a timing diagram of an operation of a first stage shown in FIG. 8.

FIG. 9 illustrates a timing diagram showing the operation of the first stage shown in FIG. 8. Although not shown in FIG. 9, the first direction control signal BI_CTL has the second level and the second direction control signal BI_CTLB has the first level. That is, the stages STAGE1 to STAGEn are driven in the order from the upper portion of the display panel 110 to the lower portion of the display panel 110.

The signals shown in FIG. 9 have the same waveforms as those of the signals shown in FIG. 5 except that the voltage at the fourth node N4 is added as the carry signal CA. In other words, the first stage STAGE1 shown in FIG. 8 is driven in the same way as the first stage STAGE1 shown in FIG. 4 except that the first stage STAGE1 shown in FIG. 8 outputs the carry signal CA.

The first node N1 has the second or third level during a period except for a period N1_H in which the first node N1 has the first level. When the first node N1 has the second or third level, the fourteenth transistor M14 is turned on. That is, the second clock signal CLK2 is applied to the fourth node N4 during the period except for the period N1_H in which the first node N1 has the first level. Accordingly, the fourth node N4 has the same waveform as the second clock signal CLK2 during the period except for the period N1_H in which the first node N1 has the first level.

When the voltage at the first node N1 has the first level, the fourteenth transistor M14 is turned off. The voltage at the second node N2 is changed to the second level from the first level when the voltage at the first node N1 is changed to the first level from the second level. When the voltage at the second node N2 has the second level, the thirteenth transistor M13 is turned on. The second voltage VGH is applied to the fourth node N4 through the turned-on thirteenth transistor M13. Thus, the voltage at the fourth node N4 has the first level and is maintained at the first level while the thirteenth transistor M13 is turned on. That is, the voltage at the fourth node N4 is maintained at the first level during a period N2_L in which the voltage at the second node N2 has the second level.

When the fourteenth transistor M14 does not exist, the second clock signal CLK2 is continuously applied to the first capacitor C1. Accordingly, the first capacitor C1 is alternately and repeatedly charged with the first level and the second level. In this case, the second clock signal CLK2 may be delayed due to the load of the first capacitor C1. That is, abnormal second clock signal CLK2 is applied to the second signal processor 152.

The fourteenth transistor M14 is turned off when the voltage at the first node N1 has the first level. When the fourteenth transistor M14 is turned off, the second clock signal CLK2 is not influenced by the third capacitor C3, and thus the delay of the second clock signal CLK2 may be prevented.

The thirteenth transistor M13 allows the fourth node N4 to be uniformly maintained when the fourteenth transistor M14 is turned off. In other words, when the fourteenth transistor M14 is turned off, the thirteenth transistor M13 is turned on, so that the voltage at the fourth node N4 is maintained at the first level.

The emission control driver of the organic light emitting display device according to the third exemplary embodiment generates the emission control signals using only the start signal FLM, the carry signal CA, the first clock signal CLK1, the second clock signal CLK2, and the second voltage VGH. That is, no additional control signals are required to initialize the emission control driver 150. Accordingly, the configuration of the emission control driver 150 may be simplified.

Figure 10:
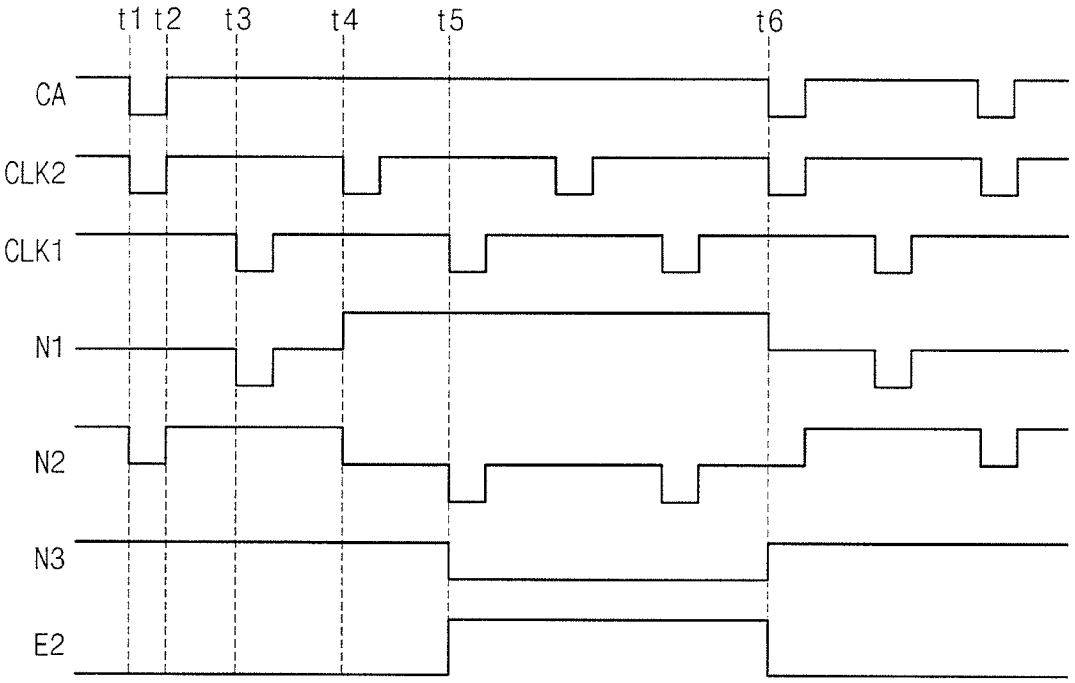
FIG. 10 illustrates a timing diagram of an operation of a second stage shown in FIG. 8.

FIG. 10 illustrates a timing diagram showing the operation of the second stage shown in FIG. 8. Referring to FIG. 10, the voltage at the fourth node N4 of the first stage STAGE1 is applied to the second stage STAGE2 as the carry signal CA. At a first time point t1, the carry signal CA and the second clock signal CLK2 have the second level and the first clock signal CLK1 has the first level.

The second clock signal CLK2 having the second level is applied to the gate terminal of the first transistor M1 and the gate terminal of the third transistor M3. Accordingly, the first and third transistors M1 and M3 are turned on.

The carry signal CA having the second level is applied to the gate terminal of the second transistor M2 and the first node N1 through the turned-on first transistor M1. Thus, the second transistor M2 is turned on and the voltage at the first node N1 has the second level.

The first clock signal CLK1 having the first level is applied to the fourth and seventh transistors M4 and M7. Therefore, the fourth and seventh transistors M4 and M7 are turned off.

Since the voltage at the first node N1 has the second level, the eighth transistor M8 is turned on. The second voltage VGH is applied to the third node N3 through the turned-on eighth transistor M8. Thus, the voltage at the third node N3 has the first level, and the ninth transistor M9 is turned off.

The voltage at the first node N1 has the second level, so that the tenth transistor M10 is turned on. Due to the turned-on tenth transistor M10, the first voltage VGL is applied to the first emission control line E1. Accordingly, the first emission control signal has the second level.

At a second time point t2, the carry signal CA, the first clock signal CLK1, and the second clock signal CLK2 have the first level. The first and third transistors M1 and M3 are turned off in response to the second clock signal CLK2 having the first level.

The voltage at the first node N1 is maintained at the second level, and thus the second transistor M2 is turned on. The first clock signal CLK1 having the first level is applied to the second node N2 through the turned-on second transistor M2. Accordingly, the voltage at the second node N2 has the first level.

Since the voltage at the first node N1 has the second level, the eighth and tenth transistors M8 and M10 are turned on. Thus, the second voltage VGH is applied to the third node N3 through the turned-on eighth transistor M8, so that the voltage at the third node N3 is maintained at the first level.

When the voltage at the third node N3 has the first level and the voltage at the first node N1 has the second level, the ninth transistor M9 is turned off and the tenth transistor M10 is turned on. Thus, the first emission control signal is maintained at the second level.

At a third time point t3, the variation of the electric potential of the first node N1, which is caused by the coupling of the first capacitor C1, is the same as described in FIG. 5.

At a fourth time point t4, the carry signal CA and the first clock signal CLK1 have the first level and the second clock signal CLK2 has the second level.

The first transistor M1 is turned on by the second clock signal CLK2 having the second level and the carry signal CA having the first level is applied to the first node N1. The voltage at the first node N1 has the first level. Since the voltage at the first node N1 has the first level, the second and tenth transistors M2 and M10 are turned off.

The third transistor M3 is turned on in response to the second clock signal CLK2 having the second level and the first voltage VGL is applied to the second node N2. Accordingly, the voltage at the second node N2 has the second level.

The seventh transistor M7 is turned off in response to the first clock signal CLK1 having the first level. Since the voltage at the first node N1 has the first level, the eighth transistor M8 is turned off. The voltage at the third node N3 is maintained at the first level by the third capacitor C3, and thus the ninth transistor M9 is turned off. As a result, the first emission control signal is maintained at the second level.

At a fifth time point t5, the carry signal CA and the second clock signal CLK2 have the first level and the first clock signal CLK1 has the second level.

The first and third transistors M1 and M3 are turned off in response to the second clock signal CLK2 having the first level. The voltage at the first node N1 is maintained at the first level. Thus, the second, eighth, and tenth transistors M2, M8, and M10 are turned off.

The fourth and seventh transistors M4 and M7 are turned on in response to the first clock signal CLK1 having the second level. In addition, since the voltage at the second node N2 has the second level, the fifth and sixth transistors M5 and M6 are turned on.

The second clock signal CLK2 having the second level is applied to the third node N3 through the turned-on sixth and seventh transistors M6 and M7. Thus, the voltage at the third node N3 has the second level at the fifth time point t5, so that the ninth transistor M9 is turned on. When the ninth transistor M9 is turned on and the tenth transistor M10 is turned off, the first emission control signal has the first level.

At a sixth time point t6, the carry signal CA and the second clock signal CLK2 have the second level and the first clock signal CLK1 has the first level. According to the operation at the first time point t1 as described above, the first emission control signal has the second level at the sixth time point t6.

As described above, the present stage generates the emission control signal in response to the first clock signal CLK1, the second clock signal CLK2, and the carry signal CA provided from the previous stage. In addition, the emission control signals output from the stages STAGE1 to STAGEn are sequentially shifted by the first duration 1H. As no additional control signals are required to initialize the emission control driver, the configuration of the emission control driver may be simplified.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An emission control driver, comprising:

a plurality of stages that sequentially outputs emission control signals through emission control lines, each stage including:

a first signal processing circuit that receives a first voltage and outputs first and second signals in response to first and second sub-control signals;

a second signal processing circuit that receives a second voltage having a level higher than a level of the first voltage and outputs third and fourth signals in response to a third sub-control signal, the first signal, and the second signal; and a third signal processing circuit that receives the first and second voltages and outputs the emission control signal in response to the third and fourth signals, wherein:

the first signal processing circuit of a first stage among the stages receives a start signal as the first sub-control signal, the first signal processing circuit of each stage except the first stage receives the emission control signal output from a previous stage as the first sub-control signal, wherein:

the fourth signal changes from a second level to a third level at a time point at which the third sub-control signal changes from a first level to the second level, and the fourth signal *of the first stage* changes from the second level to the first level at a time point at which the [start] *second sub-control* signal changes from the [second] *first* level to the [first] *second* level *and the start signal is at the first level*, the second level lower than the first level, and the third level lower than the second level.

2. The emission control driver as claimed in claim 1, wherein:

the first signal processing circuit of each of odd-numbered stages of the stages receives a first clock signal as the second sub-control signal, the second signal processing circuit of each of the odd-numbered stages of the stages receives a second clock signal as a third sub-control signal, the first signal processing circuit of each of even-numbered stages of the stages receives the second clock signal as the second sub-control signal, and the second signal processing circuit of each of the even-numbered stages of the stages receives the first clock signal as the third sub-control signal.

3. The emission control signal as claimed in claim 2, wherein the first and second clock signals have a same frequency and the second clock signal is obtained by shifting the first clock signal by a first duration corresponding to a half of a period of the first clock signal.

4. The emission control driver as claimed in claim 3, wherein the start signal is activated at a time point at which the first clock signal changes from the first level to the second level smaller than the first level, and the activation of the start signal is maintained during a second duration corresponding to four times of the first duration.

5. The emission control driver as claimed in claim 3, wherein each of the light emission control signals has the level of the second voltage during a third duration that is three times the first duration and the emission control signals are sequentially shifted by the first duration.

6. The emission control driver as claimed in claim 2, wherein the first signal processing circuit comprises:

a first transistor having a gate terminal applied with the second sub-control signal and a first terminal applied with the first sub-control signal;

a second transistor having a gate terminal connected to a second terminal of the first transistor and a second terminal applied with the second sub-control signal;

a third transistor having a gate terminal applied with the second sub-control signal, a first terminal connected to a first terminal of the second transistor, and a second terminal applied with the first voltage, wherein the first signal is output from the first terminals of the second and third transistors, which are connected to each other, and the second signal is output from the second terminal of the first transistor.

7. The emission control driver as claimed in claim 6, wherein the second signal processing circuit comprises:

a fourth transistor having a gate terminal applied with the third sub-control signal and a second terminal connected to a first node and the second terminal of the first transistor a first capacitor having a first electrode applied with the third sub-control signal and a second electrode connected to the second terminal of the fourth transistor;

a fifth transistor having a gate terminal connected to the first terminal of the third transistor and a second node, a first terminal applied with the second voltage, and a second terminal connected to a first terminal of the fourth transistor;

a sixth transistor having a gate terminal connected to the second node and a second terminal applied with the third sub-control signal;

a second capacitor having a first electrode connected to the gate terminal of the sixth transistor and a second electrode connected to a first terminal of the sixth transistor; and a seventh transistor having a gate terminal applied with the third sub-control signal, a first terminal connected to a third node, and a second terminal connected to the first terminal of the sixth transistor, wherein the third signal is applied to the third node and the fourth signal is applied to the first node.

8. The emission control driver as claimed in claim 7, wherein the third signal processing circuit comprises:

an eighth transistor having a gate terminal connected to the first node, a first terminal applied with the second voltage, and a second terminal connected to the third node;

a third capacitor having a first electrode applied with the second voltage and a second electrode connected to the third node;

a ninth transistor having a gate terminal connected to the third node, a first terminal applied with the second voltage, and a second terminal connected to a corresponding emission control line; and a tenth transistor having a gate terminal connected to the first node, a first terminal connected to the corresponding emission control line, and a second terminal applied with the first voltage, wherein the second terminal of the ninth transistor and the first terminal of the tenth transistor are connected to a first terminal of a first transistor of a first signal processing circuit of a next stage.

9. An organic light emitting display device, comprising:

a display panel that includes a plurality of pixels each being connected to a corresponding scan line of scan lines, a corresponding data line of data lines, and a corresponding emission control line of emission control lines;

a scan driver that sequentially applies scan signals to the pixels through the scan lines;

a data driver that applies data voltages to the pixels through the data lines; and an emission control driver that includes a plurality of stages sequentially applying emission control signals to the pixels through the emission control lines, each of the stages including:

a first signal processing circuit that receives a first voltage and outputs first and second signals in response to first and second sub-control signals;

a second signal processing circuit that receives a second voltage having a level higher than a level of the first voltage and outputs third and fourth signals in response to a third sub-control signal, the first signal, and the second signal; and a third signal processing circuit that receives the first and second voltages and outputs the emission control signal in response to the third and fourth signals, wherein:

the first signal processing circuit of a first stage among the stages receives a start signal as the first sub-control signal, the first signal processing circuit of each stage except the first stage receives the emission control signal output from a previous stage as the first sub-control signal, wherein:

the fourth signal changes from a second level to a third level at a time point at which the third sub-control signal changes from a first level to the second level, and the fourth signal changes from the second level to the first level at a time point at which the start signal changes from the second level to the first level, the second level lower than the first level, and the third level lower than the second level.

10. The organic light emitting display device as claimed in claim 9, wherein:

the first signal processing circuit of each of odd-numbered stages of the stages receives a first clock signal as the second sub-control signal, the second signal processing circuit of each of the odd-numbered stages of the stages receives a second clock signal as a third sub-control signal, the first signal processing circuit of each of even-numbered stages of the stages receives the second clock signal as the second sub-control signal, and the second signal processing circuit of each of the even-numbered stages of the stages receives the first clock signal as the third sub-control signal.

11. The organic light emitting display device as claimed in claim 10, wherein:

the first and second clock signals have a same frequency, the second clock signal is obtained by shifting the first clock signal by a first duration corresponding to a half of a period of the first clock signal, and the start signal is activated at a time point at which the first clock signal changes from the first level to the second level smaller than the first level, and the activation of the start signal is maintained during a second duration that is four times the first duration.

12. The organic light emitting display device as claimed in claim 11, wherein the first signal processing circuit comprises:

a first transistor having a gate terminal applied with the second sub-control signal and a first terminal applied with the first sub-control signal;

a second transistor having a gate terminal connected to a second terminal of the first transistor and a second terminal applied with the second sub-control signal; and a third transistor having a gate terminal applied with the second sub-control signal, a first terminal connected to a first terminal of the second transistor, and a second terminal applied with the first voltage, wherein the first signal is output from the first terminals of the second and third transistors, which are connected to each other, and the second signal is output from the second terminal of the first transistor.

13. The organic light emitting display device as claimed in claim 12, wherein the second signal processing circuit comprises:

a fourth transistor having a gate terminal applied with the third sub-control signal and a second terminal connected to a first node and the second terminal of the first transistor a first capacitor having a first electrode applied with the third sub-control signal and a second electrode connected to the second terminal of the fourth transistor;

a fifth transistor having a gate terminal connected to the first terminal of the third transistor and a second node, a first terminal applied with the second voltage, and a second terminal connected to a first terminal of the fourth transistor;

a sixth transistor having a gate terminal connected to the second node and a second terminal applied with the third sub-control signal;

a second capacitor having a first electrode connected to the gate terminal of the sixth transistor and a second electrode connected to a first terminal of the sixth transistor; and a seventh transistor having a gate terminal applied with the third sub-control signal, a first terminal connected to a third node, and a second terminal connected to the first terminal of the sixth transistor, wherein the third signal is applied to the third node, and the fourth signal is applied to the first node.

14. The organic light emitting display device as claimed in claim 13, wherein the third signal processing circuit comprises:

an eighth transistor having a gate terminal connected to the first node, a first terminal applied with the second voltage, and a second terminal connected to the third node;

a third capacitor having a first electrode applied with the second voltage and a second electrode connected to the third node;

a ninth transistor having a gate terminal connected to the third node, a first terminal applied with the second voltage, and a second terminal connected to a corresponding emission control line; and a tenth transistor having a gate terminal connected to the first node, a first terminal connected to the corresponding emission control line, and a second terminal applied with the first voltage, wherein the second terminal of the ninth transistor and the first terminal of the tenth transistor are connected to a first terminal of a first transistor of a first signal processing circuit of a next stage.

15. An emission control driver, comprising:

a plurality of stages that sequentially outputs emission control signals through emission control lines, each stage including:

a bi-directional driver that outputs a first input signal or a second input signal as a first sub-control signal in response to a first direction control signal and a second direction control signal;

a first signal processing circuit that receives a first voltage and outputs a first signal and a second signal in response to the first sub-control signal and a second sub-control signal;

a second signal processing circuit that receives a second voltage having a level higher than a level of the first voltage and outputs a third signal and a fourth signal in response to a third sub-control signal, the first signal, and the second signal; and a third signal processing circuit that receives the first voltage and the second voltage and outputs the emission control signal in response to the third signal and the fourth signal, wherein:

the bi-directional driver of a first stage among the stages receives a start signal as the first input signal, the bi-directional driver of a last stage among the stages receives the start signal as the second input signal, the bi-directional driver of each stage except the first stage receives the emission control signal output from a previous stage as the first input signal and the emission control signal output from a next stage as the second input signal, wherein:

the fourth signal changes from a second level to a third level at a time point at which the third sub-control signal changes from a first level to the second level, and the fourth signal changes from the second level to the first level at a time point at which the start signal changes from the second level to the first level, the second level lower than the first level, and the third level lower than the second level.

16. The emission control driver as claimed in claim 15, wherein the bi-directional driver applies the first input signal to the first signal processing circuit in response to the first direction control signal that is activated, and applies the second input signal to the first signal processing circuit in response to the second direction control signal that is activated.

17. The emission control driver as claimed in claim 16, wherein the bi-directional driver comprises:

an eleventh transistor having a gate terminal applied with the first direction control signal and a first terminal applied with the first input signal; and a twelfth transistor having a gate terminal applied with the second direction control signal, a first terminal applied with the second input signal, and a second terminal connected to a second terminal of the eleventh transistor, wherein the first sub-control signal is applied to the first signal processing circuit through the second terminals of the eleventh and twelfth transistors.

18. The emission control driver as claimed in claim 15, wherein:

the first signal processing circuit of each of odd-numbered stages of the stages receives a first clock signal as the second sub-control signal, the second signal processing circuit of each of the odd-numbered stages of the stages receives a second clock signal as a third sub-control signal, the first signal processing circuit of each of even-numbered stages of the stages receives the second clock signal as the second sub-control signal, and the second signal processing circuit of each of the even-numbered stages of the stages receives the first clock signal as the third sub-control signal.

19. The emission control driver as claimed in claim 18, wherein:

the first and second clock signals have a same frequency, the second clock signal is obtained by shifting the first clock signal by a first duration corresponding to a half of a period of the first clock signal, the start signal is activated at a time point at which the first clock signal changes from the first level to the second level smaller than the first level, and the activation of the start signal is maintained during a second duration corresponding to four times of the first duration.

20. The emission control driver as claimed in claim 18, wherein the first signal processing circuit comprises:

a first transistor having a gate terminal applied with the second sub-control signal and a first terminal applied with the first sub-control signal;

a second transistor having a gate terminal connected to a second terminal of the first transistor and a second terminal applied with the second sub-control signal; and a third transistor having a gate terminal applied with the second sub-control signal, a first terminal connected to a first terminal of the second transistor, and a second terminal applied with the first voltage, wherein the first signal is output from the first terminals of the second and third transistors, which are connected to each other, and the second signal is output from the second terminal of the first transistor.

21. The emission control driver as claimed in claim 20, wherein the second signal processing circuit comprises:

a fourth transistor having a gate terminal applied with the third sub-control signal and a second terminal connected to a first node and the second terminal of the first transistor a first capacitor having a first electrode applied with the third sub-control signal and a second electrode connected to the second terminal of the fourth transistor;

a fifth transistor having a gate terminal connected to the first terminal of the third transistor and a second node, a first terminal applied with the second voltage, and a second terminal connected to a first terminal of the fourth transistor;

a sixth transistor having a gate terminal connected to the second node and a second terminal applied with the third sub-control signal;

a second capacitor having a first electrode connected to the gate terminal of the sixth transistor and a second electrode connected to a first terminal of the sixth transistor; and a seventh transistor having a gate terminal applied with the third sub-control signal, a first terminal connected to a third node, and a second terminal connected to the first terminal of the sixth transistor, wherein the third signal is applied to the third node, and the fourth signal is applied to the first node.

22. The emission control driver as claimed in claim 21, wherein the third signal processing circuit comprises:

an eighth transistor having a gate terminal connected to the first node, a first terminal applied with the second voltage, and a second terminal connected to the third node;

a third capacitor having a first electrode applied with the second voltage and a second electrode connected to the third node;

a ninth transistor having a gate terminal connected to the third node, a first terminal applied with the second voltage, and a second terminal connected to a corresponding emission control line; and a tenth transistor having a gate terminal connected to the first node, a first terminal connected to the corresponding emission control line, and a second terminal applied with the first voltage, wherein the second terminal of the ninth transistor and the first terminal of the tenth transistor are connected to a first terminal of a first transistor of a first signal processing circuit of a next stage.

23. An emission control driver, comprising:

a plurality of stages that sequentially outputs emission control signals through emission control lines, each stage including:

a bi-directional driver that outputs a first input signal or a second input signal as a first sub-control signal in response to first and second direction control signals;

a first signal processing circuit that receives a first voltage and outputs first and a second signals in response to the first sub-control signal and a second sub-control signal;

a second signal processing circuit that receives a second voltage having a level higher than a level of the first voltage and outputs a third signal, a fourth signal, and a carry signal in response to a third sub-control signal, the first signal, and the second signal; and a third signal processing circuit that receives the first and second voltages and outputs the emission control signal in response to the third and fourth signals, wherein:

the bi-directional driver of a first stage among the stages receives a start signal as the first input signal, the bi-directional driver of a last stage among the stages receives the start signal as the second input signal, the bi-directional driver of each stage except the first stage receives the carry signal output from a previous stage as the first input signal and the carry signal output from a next stage as the second input signal, wherein:

the fourth signal changes from a second level to a third level at a time point at which the third sub-control signal changes from a first level to the second level, and the fourth signal changes from the second level to the first level at a time point at which the start signal changes from the second level to the first level, the second level lower than the first level, and the third level lower than the second level.

24. The emission control driver as claimed in claim 23, wherein the bi-directional driver applies the first input signal to the first signal processing circuit in response to the first direction control signal that is activated, and applies the second input signal to the first signal processing circuit in response to the second direction control signal that is activated.

25. The emission control driver as claimed in claim 24, wherein the bi-directional driver comprises:

an eleventh transistor having a gate terminal applied with the first direction control signal and a first terminal applied with the first input signal; and a twelfth transistor having a gate terminal applied with the second direction control signal, a first terminal applied with the second input signal, and a second terminal connected to a second terminal of the eleventh transistor, wherein the first sub-control signal is applied to the first signal processing circuit through the second terminals of the eleventh and twelfth transistors.

26. The emission control driver as claimed in claim 23, wherein:

the first signal processing circuit of each of odd-numbered stages of the stages receives a first clock signal as the second sub-control signal, the second signal processing circuit of each of the odd-numbered stages of the stages receives a second clock signal as a third sub-control signal, the first signal processing circuit of each of even-numbered stages of the stages receives the second clock signal as the second sub-control signal, and the second signal processing circuit of each of the even-numbered stages of the stages receives the first clock signal as the third sub-control signal.

27. The emission control driver as claimed in claim 26, wherein:

the first and second clock signals have a same frequency, the second clock signal is obtained by shifting the first clock signal by a first duration corresponding to a half of a period of the first clock signal, the start signal is activated at a time point at which the first clock signal changes from the first level to the second level smaller than the first level, and the activation of the start signal is maintained during a second duration corresponding to four times of the first duration.

28. The emission control driver as claimed in claim 26, wherein the first signal processing circuit comprises:

a first transistor having a gate terminal applied with the second sub-control signal and a first terminal applied with the first sub-control signal;

a second transistor having a gate terminal connected to a second terminal of the first transistor and a second terminal applied with the second sub-control signal; and a third transistor having a gate terminal applied with the second sub-control signal, a first terminal connected to a first terminal of the second transistor, and a second terminal applied with the first voltage, wherein the first signal is output from the first terminals of the second and third transistors, which are connected to each other, and the second signal is output from the second terminal of the first transistor.

29. The emission control driver as claimed in claim 28, wherein the second signal processing circuit comprises:

a fourth transistor having a gate terminal applied with the third sub-control signal and a second terminal connected to the first node and the second terminal of the first transistor;

a first capacitor having a first electrode connected to a fourth node and a second electrode connected to the second terminal of the fourth transistor;

a fifth transistor having a gate terminal connected to the first terminal of the third transistor and a second node, a first terminal applied with the second voltage, and a second terminal connected to a first terminal of the fourth transistor;

a sixth transistor having a gate terminal connected to the second node and a second terminal applied with the third sub-control signal;

a second capacitor having a first electrode connected to the gate terminal of the sixth transistor and a second electrode connected to a first terminal of the sixth transistor;

a seventh transistor having a gate terminal applied with the third sub-control signal, a first terminal connected to a third node, and a second terminal connected to the first terminal of the sixth transistor;

a thirteenth transistor having a gate terminal connected to the second node, a first terminal applied with the second voltage, and a second terminal connected to the fourth node; and a fourteenth transistor having a gate terminal connected to the second electrode of the first capacitor, a first terminal connected to the fourth node, and a second terminal applied with the [first] *second* clock signal, wherein the third signal is applied to the third node, the fourth signal is applied to the first node, and a voltage at the fourth node is output as the carry signal.

30. The emission control driver as claimed in claim 29, wherein the third signal processing circuit comprises:

an eighth transistor having a gate terminal connected to the first node, a first terminal applied with the second voltage, and a second terminal connected to the third node;

a third capacitor having a first electrode applied with the second voltage and a second electrode connected to the third node;

a ninth transistor having a gate terminal connected to the third node, a first terminal applied with the second voltage, and a second terminal connected to a corresponding emission control line; and a tenth transistor having a gate terminal connected to the first node, a first terminal connected to the corresponding emission control line, and a second terminal applied with the first voltage, wherein the second terminal of the ninth transistor and the first terminal of the tenth transistor are connected to a first terminal of a first transistor of a first signal processing circuit of a next stage.

*31. An emission control driver, comprising:*

*a first voltage source;*

*a second voltage source having a voltage lower than a voltage of the first voltage source; and*

*a plurality of stages that sequentially output emission control signals through emission control lines, each of the stages comprising:*

*a first transistor receiving a second sub-control signal and a first sub-control signal, the first transistor being controlled by the second sub-control signal;*

*a second transistor connected to the first voltage source and a corresponding one of the emission control lines;*

*a third transistor connected to the first transistor, the second transistor, and the second voltage source;*

*a first capacitor including a first electrode connected to the first transistor and a second electrode receiving a third sub-control signal;*

*a second capacitor connected to the first voltage source and the second transistor; and*

*a fourth transistor connected to the second transistor, the third transistor, and the first voltage source,*

*wherein the corresponding one of the emission control lines is connected between the second transistor and the third transistor, and*

*wherein the first transistor of each of the stages except a first one of the stages receives the emission control signal output from a previous stage as the first sub-control signal.*

*32. The emission control driver of claim 31, wherein the third transistor is controlled by three voltage levels.*

*33. The emission control driver of claim 31, wherein each of the stages further comprises:*

*a third capacitor connected to the second transistor and receiving the second sub-control signal.*

*34. The emission control driver of claim 33, wherein each of the stages further comprises:*

*a fifth transistor connected to the third capacitor and receiving the third sub-control signal.*

*35. The emission control driver of claim 34, wherein each of the stages further comprises:*

*a sixth transistor connected to the third capacitor and the first transistor, and receiving the second sub-control signal; and*

*a seventh transistor connected to the third capacitor and the second voltage source, receiving the second sub-control signal, and controlled by the second sub-control signal.*

*36. The emission control driver of claim 32, wherein each of the stages further comprises:*

*a third capacitor connected the second transistor and receiving the second sub-control signal.*

*37. The emission control driver of claim 36, wherein each of the stages further comprises:*

*a fifth transistor connected to the third capacitor and receiving the third sub-control signal.*

*38. The emission control driver of claim 37, wherein each of the stages further comprises:*

*a sixth transistor connected to the third capacitor and the first transistor, and receiving the second sub-control signal; and*

*a seventh transistor connected to the third capacitor and the second voltage source, receiving the second sub-control signal, and controlled by the second sub-control signal.*

* * * * *